US012730968B2

(12) United States Patent
Khullar et al.

(10) Patent No.: US 12,730,968 B2
(45) Date of Patent: Sep. 8, 2026

(54) INTELLIGENT HANDLING OF API QUERIES

(71) Applicant: SAP SE, Walldorf (DE)

(72) Inventors: Vipul Khullar, New Delhi (IN); Jan Dumke, Wiesloch (DE)

(73) Assignee: SAP SE, Walldorf (DE)

(*) Notice: Subject to any disclaimer, the term of this patent is extended or adjusted under 35 U.S.C. 154(b) by 248 days.

(21) Appl. No.: 18/597,397

(22) Filed: Mar. 6, 2024

(65) Prior Publication Data

US 2025/0284888 A1 Sep. 11, 2025

(51) Int. Cl.
*G06F 40/284* (2020.01)
*G06F 16/242* (2019.01)
*G06F 16/25* (2019.01)
*G06F 40/205* (2020.01)

(52) U.S. Cl.
CPC .......... *G06F 40/284* (2020.01); *G06F 16/243* (2019.01); *G06F 16/252* (2019.01); *G06F 40/205* (2020.01)

(58) Field of Classification Search
CPC .... G06F 40/284; G06F 40/205; G06F 16/243; G06F 16/252
See application file for complete search history.

(56) References Cited

U.S. PATENT DOCUMENTS 9,778,967 B2 * 10/2017 Ekanadham ........ G06F 16/9024
10,997,187 B2 * 5/2021 Aggour .................... G06N 5/02
11,526,332 B2 * 12/2022 Wolfram ................ G06F 40/40
11,593,383 B1 * 2/2023 Pechacek ............ H04L 67/1004
12,008,332 B1 * 6/2024 Gardner ................ G06F 16/345
2023/0297927 A1 * 9/2023 Jagadeesan ............. G06F 16/31 705/7.42
2024/0012864 A1 * 1/2024 Siegel ................. G06F 16/9536
2025/0103401 A1 * 3/2025 Singh .................. G06F 11/3688
2025/0111167 A1 * 4/2025 Mcintyre .............. G06F 16/383
2025/0181899 A1 * 6/2025 Ajmera ................ G06N 3/0475
2025/0209094 A1 * 6/2025 Mandal ................. G06F 16/248

FOREIGN PATENT DOCUMENTS

CN 115268995 A * 11/2022 ........... G06F 16/367

OTHER PUBLICATIONS https://www.akkio.com/post/chatgpt-advanced-data-analysis (Year: 2023).*

* cited by examiner

*Primary Examiner* — Anne L Thomas-Homescu
(74) *Attorney, Agent, or Firm* — Klarquist Sparkman, LLP

(57) ABSTRACT

A computer-implemented method can receive a natural language query input from a user interface, extract a target entity from the natural language query input, identify a target application programming interface (API) corresponding to the target entity, formulate an API query using the target API, and execute the API query to generate a query output on the user interface. Identifying the target API includes generating a vector representation of the target entity, searching an entity vector database containing vector representations of a plurality of APIs to return one or more candidate APIs whose vector representations match the vector representation of the target entity, and prompting a generative artificial intelligence model to select the target API from the one or more candidate APIs.

20 Claims, 17 Drawing Sheets

100

```
. . .
<edmx:DataServices>
 <Schema Namespace="com.sap.gateway.srvd_a2x.api_acmtradingcontract.v0001" Alias="SAP__self">
   <Annotation Term="SAP__core.SchemaVersion" String="1.0.0"/>
   <EntityType Name="TradingContractHeaderText_Type">
     <Key>
       <PropertyRef Name="TradingContractNumber"/>
       <PropertyRef Name="TextObjectType"/>
     </Key>
     <Property Name="TradingContractNumber" Type="Edm.String" Nullable="false" MaxLength="10"/>
     <Property Name="TextObjectType" Type="Edm.String" Nullable="false" MaxLength="4"/>
     <Property Name="TextObjectCategory" Type="Edm.String" Nullable="false" MaxLength="10"/>
     <Property Name="ExternalRelevance" Type="Edm.String" Nullable="false" MaxLength="2"/>
     <Property Name="TextDescription" Type="Edm.String" Nullable="false" MaxLength="1333"/>
     <NavigationProperty Name="_ContractHeader" Type="com.sap.gateway.srvd_a2x.api_acmtradingcontract.v0001...
       <ReferentialConstraint Property="TradingContractNumber" ReferencedProperty="TradingContractNumber"/>
     </NavigationProperty>
   </EntityType>
   <EntityType Name="TradingContractItem_Type">

     </Key>
     <Property Name="TradingContractNumber" Type="Edm.String" Nullable="false" MaxLength="10"/>
     <Property Name="TradingContractItem" Type="Edm.String" Nullable="false" MaxLength="6"/>
     <Property Name="TradingContractType" Type="Edm.String" Nullable="false" MaxLength="4"/>
     <Property Name="ContractMaterial" Type="Edm.String" Nullable="false" MaxLength="40"/>
     <Property Name="Commodity" Type="Edm.String" Nullable="false" MaxLength="18"/>
     <Property Name="ACMTrdgContrActualStartDate" Type="Edm.Date"/>
     <Property Name="ActualStartDateTo" Type="Edm.Date"/>
     <Property Name="ContractPlant" Type="Edm.String" Nullable="false" MaxLength="4"/>
```

```
[
    {
        "EntityName":  "TradingContractHeader",
        "Properties":  [
            "TradingContractNumber",
            "TradingContractType",
            "ContractStatus",
            "ACMContractCategory",
            "ACMTrdgContrStatusCategory",
            . . .
        ],
        "Associations":  [
            "_ContractHeaderFee",
            "_ContractHeaderText",
            "_ContractItem",
            . . .
        ],
        "Actions":  [
            "CreatContractFromBid",
            {
                "Name":  "CreatContractFromBid",
                "Parameters": [
                    {
                        "Name": "ACMORIGNIALTRADERID",
                        "Type":  "Edm.string",
                        "Nullable": "false",
                        "MaxLength": 12
                    },
                . . .
```

```
{
  "@odata.context": "$metadata#TradingContractHeader(_ContractItem(_QuantityTypes()))/$entity",
  "@odata.metadataEtag": "W/\"20230817143100\"",
  "TradingContractNumber": "186170",
  "TradingContractType": "AC3P",
  "ContractStatus": "T",
  "ACMContractCategory": "C",
  "ACMTrdgContrStatusCategory": "C",
  "Side": "M",
  "TradingContractCurrency": "USD",
  ...
  "_ContractItem": [
    {
      "TradingContractNumber": "186170",
      "TradingContractItem": "10",
      "TradingContractType": "AC3P",
      "ContractMaterial": "CO_SOYBEANS_01",
      "Commodity": "SOYBEANS",
      "ACMTrdgContrActualStartDate": "2023-07-01",
      "ActualStartDateTo": "2023-07-31",
      "ContractPlant": "0001",
      "TradingContractItemQuantity": 100.000,
      "UnitOfMeasure": "BU",
      "PricingApproach": "FB",
      "ValuationPoint": "D_0001_SB",
      "ContractStorageLocation": "",
      "SAP__Messages": [],

  ]
}
```

```
"Actions": [
    "FetchFuturePrice",
    {
        "Name": "FetchFuturePrice",
        "Parameters": []
    },
    "SaveACMFuturePrice",
    {
        "Name": "SaveACMFuturePrice",
        "Parameters": [
            {
                "Name": "TRADINGCONTRACTNUMBER",
                "Type": "Edm.String",
                "Nullable": "false",
                "MaxLength": "10"
            },
            {
                "Name": "TRADINGCONTRACTITEM",
                "Type": "Edm.String",
                "Nullable": "false",
                "MaxLength": "6"
            },
            {
                "Name": "_PRICINGINFO",
                "Type":
"Collection(com.sap.gateway.srvd_a2x.api_acmtradingcontract.v0001.xACCGOxACM_S_TRDGPRICINGINFO)",
                "Nullable": "false",
                "MaxLength": null
            }
        ]
    },
```

```
{
 "@odata.context": "https://<tenant_id>/sap/opu/odata4/sap/api_acmtradingcontract/srvd_a2x/sap/api_acmtradingcontract/0001/
$metadata#TradingContractHeader",
 "value": [
  {
   "name": "TradingContractHeader",
   "kind": "EntitySet",
   "entityType": "Namespace.TradingContractHeader",
   // ... other entity set information
   "NavigationPropertyBinding": {
    "Commodity": "CommoditySet",
    "Plant": "PlantSet"
    // ... other navigation property bindings
   }
  },
  {
   "name": "Commodity",
   "kind": "EntitySet",
   "entityType": "Namespace.Commodity",
   // ... other entity set information
  },
  {
   "name": "Plant",
   "kind": "EntitySet",
   "entityType": "Namespace.Plant",
   // ... other entity set information
  },
  {
   "name": "TradingContractHeader_Commodity",
   "kind": "AssociationSet",
   "association": "Namespace.TradingContractHeader_Commodity",
   // ... other association set information
  },
  {
   "name": "TradingContractHeader_Plant",
   "kind": "AssociationSet",
   "association": "Namespace.TradingContractHeader_Plant",
   // ... other association set information
  },
  // ... other entity type and association definitions
 ]
}
```

```
{
  "@odata.context": "https://<tenant_id>/sap/opu/odata4/sap/api_acmtradingcontract/srvd_a2x/sap/api_acmtradingcontract/
0001/$metadata#TradingContractHeader",
  "value": [
    {
      "Id": 1,
      "Commodity": "Soybean",
      "DeliveryPeriodStart": "2023-04-01",
      "DeliveryPeriodEnd": "2023-04-20",
      "OtherProperty": "OtherValue",
      // ... other properties
    },
    {
      "Id": 5,
      "Commodity": "Soybean",
      "DeliveryPeriodStart": "2023-04-05",
      "DeliveryPeriodEnd": "2023-04-25",
      "OtherProperty": "OtherValue",
      // ... other properties
    },

    // Additional TradingContractHeader entities that match the query criteria
  ]
}
```

INTELLIGENT HANDLING OF API QUERIES

BACKGROUND

An Application Programming Interface (API) serves as a bridge between different software applications, enabling them to communicate seamlessly. APIs define rules for data exchange and functionality between systems. In the enterprise environment, APIs allow companies to open up their application data and features to external developers, business partners, and internal departments. By integrating APIs, organizations can automate workflows, enhance collaboration, and break down information silos, simplifying application development, service delivery, and management. However, in a large enterprise system with an extensive API library, business users often grapple with effectively utilizing APIs due to their limited technical expertise. For example, end users may not fully understand available structured query language (SQL) queries, API endpoints, and data structures defined in various APIs. Thus, room for improvement exists for effectively utilize APIs in enterprise environment.

BRIEF DESCRIPTION OF THE DRAWINGS

FIG. 7 depicts a portion of metadata of an example API in entity data model XML (EDMX) format.

FIG. 8 depicts a portion of extracted metadata in JSON format.

FIG. 10 depicts a portion of mock data generated for an API.

FIG. 13 depicts an example payload for a generated API query.

FIG. 14 depicts a portion of metadata included in an example API graph.

FIG. 15 depicts a portion of output from an example API query.

DETAILED DESCRIPTION

Overview of API Usage in Enterprise Environment

Business users frequently encounter challenges when querying and retrieving data from a multitude of complex systems within a hybrid landscape. Retrieving information via traditional methods, such as user interface (UI) may not suffice because UIs are not optimized for complex analytical queries and lack the necessary structures for efficient querying. Instead, users may need to make API calls directly to retrieve information, bypassing the limitations of UI-based querying. However, this approach necessitates users' understanding of SQL queries, API endpoints, query parameters, and data structures, which can be a significant hurdle for those without technical proficiency.

For example, each API endpoint corresponds to a specific functionality or dataset. Users must decipher their purpose, parameters, and authentication mechanisms. A misstep in endpoint selection can lead to erroneous results or security vulnerabilities. As another example, users encounter several obstacles if they lack familiarity with the structure of input parameters for APIs. First, users must understand the syntax and semantics of these parameters because incorrectly formatted or missing parameters can lead to failed requests or unexpected behavior. Second, users must also grasp the valid values and constraints associated with each parameter. Without this knowledge, users risk sending invalid data. Further, some APIs have nested or complex parameter structures, such as arrays or nested objects. Users must navigate these intricacies accurately to construct valid requests.

The technologies described herein overcome many of the challenges described above and allow business users without technical proficiency to harness the capabilities of API queries. Specifically, disclosed herein is a technical solution that leverages the power of generative artificial intelligence (AI) and structured API metadata. This combination enables organizations to build highly effective and intuitive query response systems, improving their understanding of user inquiries and producing precise responses. The systematic form of API metadata proves advantageous for generative AI, allowing it to retrieve real-time information for formulating API queries and payloads. By integrating API metadata with generative AI, organizations can create dynamic responses and perform desired actions by preparing the API query format to access necessary data sources or backend services.

Example Computing System Supporting Intelligent Handling of API Queries

Figure 1:
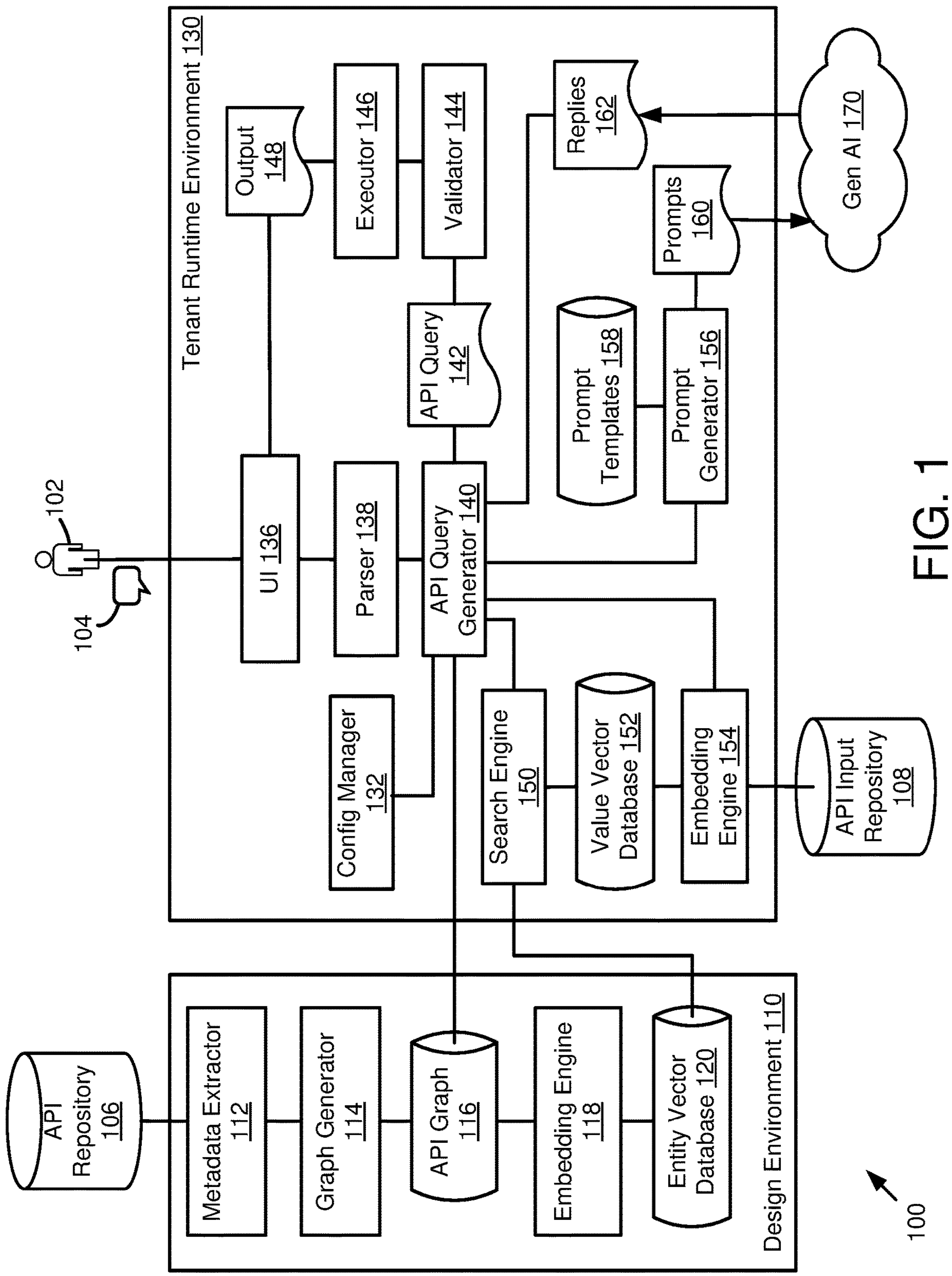
FIG. 1 is an overall block diagram of an example computing system supporting intelligent handling of API queries.

FIG. 1 shows an overall block diagram of an example computing system 100 supporting intelligent handling of API queries, also referred to as intelligent user query answering.

In some examples, the computing system 100 can be configured to support multitenancy, which is a feature in many types of cloud computing services, such as infrastructure-as-a-service (IaaS), platform-as-a-service (PaaS), software-as-a-service (SaaS), etc. In a multitenant cloud-based computing environment, one instance of a software application and supporting infrastructure can serve multiple tenants, who can share the same application and other computing resources running on the same operating system, on the same hardware, with the same data-storage mechanism(s). Even though resources are shared, each tenant can appear to have its own instance of the application and the underlying data of the tenants can be kept separate and secure. In the example depicted in FIG. 1, the computing system 100 includes a design environment 110 (which can be in the cloud) and a tenant runtime environment 130 (which can be specific to one particular tenant).

Overall, the computing system 100 provides a chat interface, powered by generative AI, where business users can query information from various entities in the available API sets. Users can also request actions that can be automated via APIs. The computing system 100 can generate an API query and payload from the available APIs using generative AI, with the API called through standard programming logic (but not autonomously to avoid security risks). Implementation of the solution for intelligent handling of API queries can be divided into three phases: a design phase, a deployment phase, and a runtime query phase, as described more fully below.

The design environment 110 can be configured to implement some design phase tasks. For example, during the design phase, an API graph can be intelligently constructed from available API sources. The API graph can serve as a repository for all business API endpoints and credentials across various micro-services and/or solutions in a hybrid environment. The API graph can include a plurality of entities representing respective APIs and define associations between those entities/APIs. Documentations and/or sample values related to those APIs can also be included in the API graph. Information contained in the API graph can be embedded into an entity vector database, which can be deployed and used by the tenant runtime environment 130.

As shown in FIG. 1, the design environment 110 can include a metadata extractor 112, a graph generator 114, and an embedding engine 118. The metadata extractor 112 can be configured to extract metadata (e.g., API endpoints, API data structures, etc.) from APIs included in an API repository 106. The graph generator 114 can be configured to generate an API graph 116 based on API metadata extracted by the metadata extractor 112. The embedding engine 118 can be configured to create an entity vector database 120 based on the API graph 116. Example methods for extracting metadata, generating the API graph, and creating the entity vector database are described more fully below.

The created API graph 116 and the entity vector database 120 can be deployed on the tenant runtime environment 130, e.g., during the deployment phase. Tasks implemented during the deployment phase can include establishing tenant-specific configurations (e.g., to provide credentials for accessing different APIs, etc.) and creating a tenant-specific value vector database which can be used for intelligent mapping of user's input to proper input values of APIs.

Post-deployment, a tenant user's queries or commands can be received via a chat interface, e.g., during the runtime query phase. The API graph, the entity vector database, and the value vector database can be used to formulate an API query structure, including filter parameters and payload. The APIs can be activated through code to fetch the results, which can be subsequently pre-processed and presented in the user-desired format.

The tenant runtime environment 130 can include a configuration manager 132. During the deployment phase, the configuration manager 132 can perform certain configurations to prepare the tenant runtime environment 130 for the subsequent runtime query phase. For example, the configuration manager 132 can append tenant-specific domain names to the API endpoints included in the API graph 116 so as to generate tenant URLs for those APIs. The configuration manager 132 can also supply authentication parameters (e.g., client ID, passcodes, etc.) which are necessary for accessing those APIs. In some examples, the configuration manager 132 can also establish communication protocols to facilitate seamless communication between the tenant runtime environment 130 and various servers that deliver the API services.

The tenant runtime environment 130 can also include an embedding engine 154, which can be similar to the embedding engine 118 included in the design environment 110. During the deployment phase, the embedding engine 154 can be used to create a value vector database 152 based on an API input repository 108, which stores tenant-specific values that can be used as input to various APIs. Example method for creating the value vector database is described further below.

The tenant runtime environment 130 can include a user interface, or UI 136, through which a tenant user 102 can enter a natural language query input 104 during the runtime query phase. The natural language query input 104 can be an instruction or command from the user 102 to perform a query without providing a specific SQL query statement using a query syntax. In other words, the user 102 can chat in a conversational manner using natural language. Thus, the UI 136 can also be referred to as a chat interface.

As shown in FIG. 1, the tenant runtime environment 130 can include a parser 138, an API query generator 140, a validator 144, an executor, a search engine 150, and a prompt generator 156. The prompt generator 156 can interact with a generative AI model 170. Specifically, the prompt generator 156 can generate prompts 160, e.g., by using predefined prompt templates 168. As described herein, a prompt template 168 can include placeholders that allow for the acceptance of various inputs, facilitating generation of dynamic and context-specific prompts 160. The prompts 160 are sent to the generative AI model 170, which can generate replies 162 in response to the received prompts 160.

The parser 138 can be configured to extract relevant context from the natural language query input 104. Example context information includes intent of the user 102 (e.g., read, create, update, delete, etc.), entities, parameters, and parameter values specified in the language query input 104.

In some examples, the parser 138 can leverage the generative AI model 170 to extract the context information. For example, the parser 138 can forward the natural language query input 104 to the prompt generator 156, which can use selected prompt templates 158 to generate one or more prompts 160 configured to prompting the generative AI model 170 to extract relevant context from the natural language query input 104.

The API query generator 140 can be configured to formulate an API query 142 based on the extracted context information. The formulated API query 142 can include configuration information (e.g., tenant-specific URLs, authentication parameters, etc.) provided by the configuration manager 132.

To formulate the API query 142, the API generator 140 can map the extracted entities to corresponding APIs (also referred to as target APIs), and further map the extracted parameter values to corresponding input values of those APIs (also referred to as target input values). To perform the mapping, the embedding engine 154 can embed the extracted context information into vector representations (also referred to as "vector embeddings," or simply "embeddings"). Then, the search engine 150 can search the entity vector database 120 and/or the value vector database 152 to identify one or more candidate APIs and one or more candidate input values. The target APIs can be selected from the candidate APIs, and the target input values can be selected from the candidate input values. If the target API performs put or post operations, a payload can be generated for the target API by organizing the target input values into a payload structure which is specific to the target API and defined in the API graph 116.

In some examples, the API query generator 140 can leverage the generative AI model 170 to formulate the API query 142. For example, the identified candidate APIs and candidate input values can be forwarded to the prompt generator 156, which can use selected prompt templates 158 to generate prompts 160 which prompt the generative AI model 170 to select target APIs from the candidate APIs and select target input values from the candidate API values.

The validator 144 can be configured to validate the formulated API query 142 (e.g., checking query syntax, input data type, tenant credentials, data security, etc.). After being validated, the API query 142 can be executed by the executor 146 to generate a query output 148, which can be sent to the UI 136 for presentation to the user 102.

In some examples, the query output 148 can be transformed into a format desired by the user 102 before being sent to the UI 136. For instance, the parser 138 can extract an output format specified in the natural language query input 104. As another example, the output format can be predefined by an administrator of the tenant runtime environment 130. The query output 148 originally generated by the executor 146, along with the output format, can be forwarded to the prompt generator 156. Using a selected prompt template 158, the prompt generator 156 can generate a prompt 160 which prompts the generative AI model 170 to transform the query output 148 into the output format.

In practice, the systems shown herein, such as the computing system 100, can vary in complexity, with additional functionality, more complex components, and the like. For example, there can be additional functionality within the design environment 110 and/or the tenant runtime environment 130. Additional components can be included to implement security, redundancy, load balancing, report design, data logging, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, APIs, queries, prompts, metadata, and the like can be stored in one or more computer-readable storage media or computer-readable storage devices. The technologies described herein can be generic to the specifics of operating systems or hardware and can be applied in any variety of environments to take advantage of the described features.

Example Implementation Phases

Figure 2:
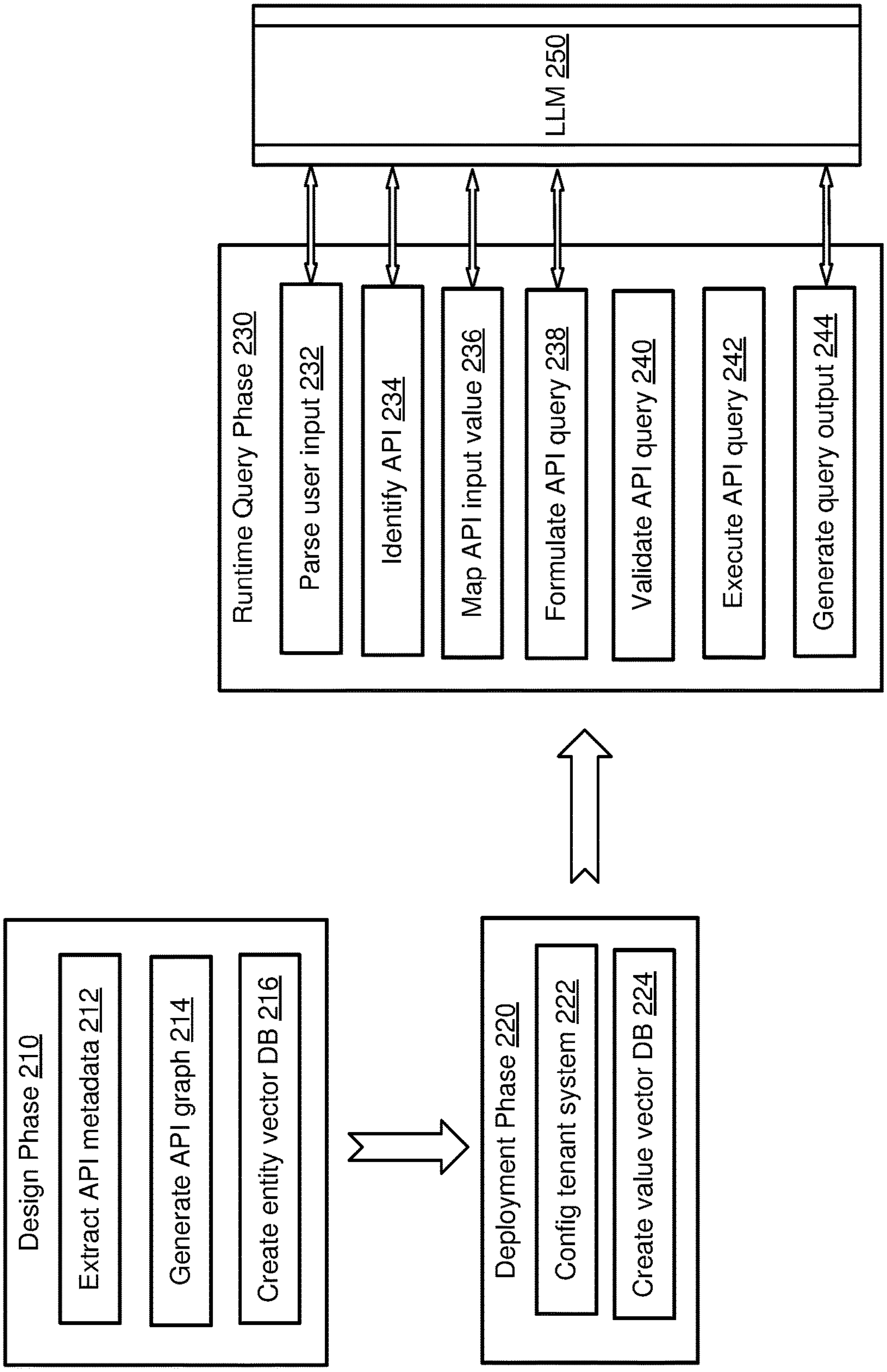
FIG. 2 depicts different phases for implementing a solution for intelligent handling of API queries.

FIG. 2 provides a high-level overview of three different phases, namely design phase 210, deployment phase 220, and runtime query phase 230, for implementing a solution for intelligent handling of API queries.

During the design phase 210, several tasks can be executed, e.g., in the design environment 110. One task 212 is the extraction of API metadata (e.g., from the API repository 106), which can be performed, e.g., by the metadata extractor 112. The API metadata is a comprehensive set of information that describes the APIs and their usage. Example metadata of an API includes the API's title, description, tags, categories, creation and modification details, and access information. The API metadata can also outline the data structures that the API can accept (as input) and return (as output), the endpoints for accessing its functionality, and any authentication requirements. Additionally, API metadata can include error codes, rate limits, API version, etc. In some examples, the extracted API metadata can also include documents and/or examples (or the links to thereof) which describe how to use the APIs.

Another task 214 in the design phase 210 is using the extracted API metadata to generate the API graph 116, which defines a plurality of entities representing respective APIs and associations between those entities. In some examples, the entities can be represented by nodes, and the associations between the entities can be represented as edges which connect related entities. Each entity can include a multitude of attributes depicting various metadata of the corresponding API, such as API endpoints, API data structure, API documents, etc. In some examples, mock data for the APIs can be generated in the design phase 210, and these mock data (or the links to thereof) can also be included in the API graph.

Yet another task 216 in the design phase 210 is to create the entity vector database 120. The entity vector database 120 can be created, e.g., by the embedding engine 118, based on the API graph 116. The entity vector database 120 can include vector representations of the API metadata and/or API documents included in the API graph 116. In some examples, a data storage space for the value vector database 152 (to be created during the deployment phase 220) can be created or enabled in the design phase 210.

During the deployment phase 220, the API graph 116 and entity vector database 120 created in the design environment 110 can be deployed on or made available to the tenant runtime environment 130. The deployment phase 220 involves several preprocessing tasks to prepare the tenant runtime environment for the runtime query phase. One task 222 in the deployment phase 220 is configuring the tenant system. As described above, configuration of the tenant runtime environment 130 (e.g., performed by the configuration manager 132) can include appending tenant-specific domain names to API endpoints, supplying necessary authentication parameters, and establishing communication protocols for interaction with API servers.

Another task 224 in the deployment phase 220 is to create the value vector database 152, e.g., using the embedding engine 154, based on an API input repository 108, which stores tenant-specific values that can be used as input to various APIs. The value vector database 152 plays an important role in ensuring the smooth interaction between the user and the tenant runtime environment 130. It addresses a common issue where user-entered parameter values, particularly those in natural language, may not match the standard input values recognized by the tenant system. For instance, a user might refer to the "United States" as "US", "USA", or "America." While these terms are commonly understood by humans, they may not be recognized by an API expecting the standard value "United States" for the "Country" parameter. Moreover, these standard values can vary between different tenants. For example, one tenant might accept "United States" as a valid input for the "Country" parameter, while another tenant might only accept "USA." This highlights the tenant-specific nature of the mapping process.

To facilitate this mapping, later in the runtime query phase 230, the parameter value entered by the user can be converted into a vector representation using the embedding engine 154. This vector is then compared with the vector representations of the standard input values stored in the value vector database 152, which were generated based on the tenant-specific API input repository 108. A similarity measure can be used to identify the vectors in the database that are most similar to the vector of the user's input. The standard input values corresponding to these identified vectors can then replace the user's original input when calling the API query 142. This process ensures that the API query 142 receives a valid, tenant-specific input value, regardless of the terminology used by the user.

During the runtime query phase 230, a tenant user can interact with the tenant runtime environment 130, e.g., by entering natural language query input 104 through the UI 136. The runtime query phase 230 involves a number of tasks, including parsing user input (task 232), identifying a target API corresponding to the user input (task 234), mapping user entered parameter values to standard API input values (task 236), formulating an API query (task 238), validating the API query (task 240), executing the validated API query (task 242), and generating a query output with a user desired output format (task 244). These tasks can be performed by various components of the tenant runtime environment 130 described above. In some examples, several tasks can be performed in collaboration with a pre-trained large language model (LLM) 250, which is one example embodiment of generative AI model 170 and is described further below.

Example Overview of LLMs and Prompts

Generative AI is a type of AI that can create content, such as text, images, or even code, and it is used in enterprise environments for tasks like automated content generation, data analysis, and chatbot interactions to enhance productivity and efficiency. In contrast to discriminative AI models which aim to make decisions or predictions based on features of the input data, generative AI models focus on generating new data points. The LLM is a type of generative AI that can understand and generate human-like text. In generative AI, such as LLMs, a prompt serves as an input or instruction that informs the AI of the desired content, context, or task, allowing users to guide the AI to produce tailored responses, explanations, or creative content based on the provided prompt.

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided, in runtime, to LLMs to generate responses. Prompts in LLMs can be input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Experiment with prompt variations can be performed to manipulate output, using techniques like prefixing, temperature control, top-K sampling, chain-of-thought, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

Example Architecture of LLM

Figure 3:
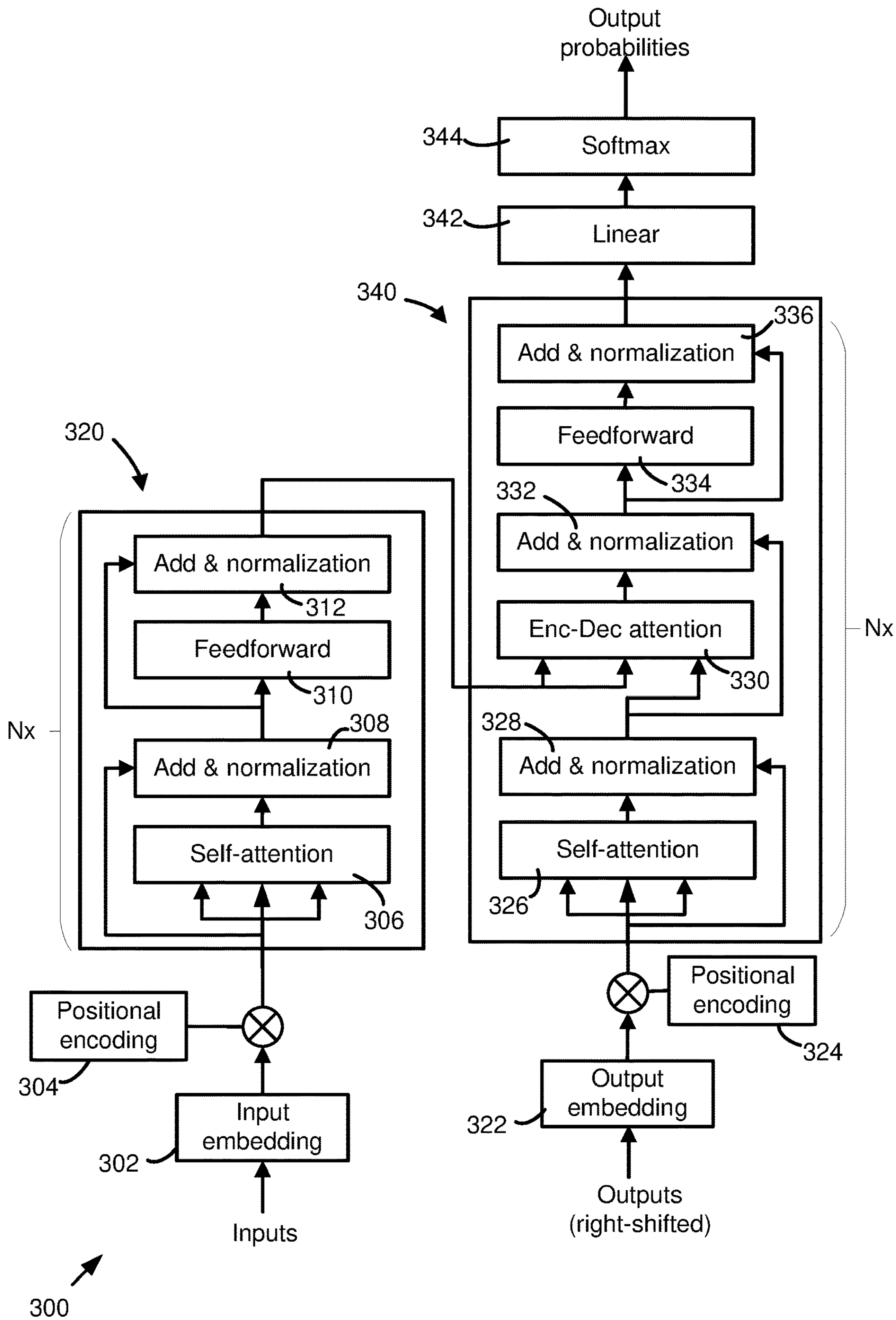
FIG. 3 is an architecture diagram of an example large language model.

FIG. 3 shows an example architecture of an LLM 300, which can be used as the generative AI model 170 of FIG. 1 or the LLM 250 of FIG. 2.

In the depicted example, the LLM 300 uses an autoregressive model (as implemented in OpenAI's GPT) to generate text content by predicting the next word in a sequence given the previous words. The LLM 300 can be trained to maximize the likelihood of each word in the training dataset, given its context.

As shown in FIG. 3, the LLM 300 can have an encoder 320 and a decoder 340, the combination of which can be referred to as a "transformer." The encoder 320 processes input text, transforming it into a context-rich representation. The decoder 340 takes this representation and generates text output.

For autoregressive text generation, the LLM 300 generates text in order, and for each word it generates, it relies on the preceding words for context. During training, the target or output sequence, which the model is learning to generate, is presented to the decoder 340. However, the output is right shifted by one position compared to what the decoder 340 has generated so far. In other words, the model sees the context of the previous words and is tasked with predicting the next word. As a result, the LLM 300 can learn to generate text in a left-to-right manner, which is how language is typically constructed.

Text inputs to the encoder 320 can be preprocessed through an input embedding unit 302. Specifically, the input embedding unit 302 can tokenize a text input into a sequence of tokens, each of which represents a word or part of a word. Each token can then be mapped to a fixed-length vector known as an input embedding, which provides a continuous representation that captures the meaning and context of the text input. Likewise, to train the LLM 300, the targets or output sequences presented to the decoder 340 can be preprocessed through an output embedding unit 322. Like the input embedding unit 302, the output embedding unit 322 can provide a continuous representation, or output embedding, for each token in the output sequences.

Generally, the vocabulary in LLM 300 is fixed and is derived from the training data. The vocabulary in LLM 300 consists of tokens generated above during the training process. Words not in the vocabulary cannot be output. These tokens are strung together to form sentences in the text output.

In some examples, positional encodings (e.g., 304 and 324) can be performed to provide sequential order information of tokens generated by the input embedding unit 302 and output embedding unit 322, respectively. Positional encoding is needed because the transformer, unlike recurrent neural networks, process all tokens in parallel and do not inherently capture the order of tokens. Without positional encoding, the model would treat a sentence as a collection of words, losing the context provided by the order of words. Positional encoding can be performed by mapping each position/index in a sequence to a unique vector, which is then added to the corresponding vector of input embedding or output embedding. By adding positional encoding to the input embedding, the model can understand the relative positions of words in a sentence. Similarly, by adding positional encoding to the output encoding, the model can maintain the order of words when generating text output.

Each of the encoder 320 and decoder 340 can include multiple stacked or repeated layers (denoted by Nx in FIG. 3). The number of stacked layers in the encoder 320 and/or decoder 340 can vary depending on the specific LLM architecture. Generally, a higher "N" typically means a deeper model, which can capture more complex patterns and dependencies in the data but may require more computational resources for training and inference. In some examples, the number of stacked layers in the encoder 320 can be the same as the number of stacked layers in the decoder 340. In other examples, the LLM 300 can be configured so that the encoder 320 and decoder 340 can have different numbers of layers. For example, a deeper encoder (more layers) can be used to better capture the input text's complexities while a shallower decoder (fewer layers) can be used if the output generation task is less complex).

The encoder 320 and the decoder 340 are related through shared embeddings and attention mechanisms, which allow the decoder 340 to access the contextual information generated by the encoder 320, enabling the LLM 300 to generate coherent and contextually accurate responses. In other words, the output of the encoder 320 can serve as a foundation upon which the decoder network can build the generated text.

Both the encoder 320 and decoder 340 comprise multiple layers of attention and feedforward neural networks. An attention neural network can implement an "attention" mechanism by calculating the relevance or importance of different words or tokens within an input sequence to a given word or token in an output sequence, enabling the model to focus on contextually relevant information while generating text. In other words, the attention neural network plays "attention" on certain parts of a sentence that are most relevant to the task of generating text output. A feedforward neural network can process and transform the information captured by the attention mechanism, applying non-linear transformations to the contextual embeddings of tokens, enabling the model to learn complex relationships in the data and generate more contextually accurate and expressive text.

In the example depicted in FIG. 3, the encoder 320 includes an intra-attention or self-attention neural network 306 and a feedforward neural network 310, and the decoder 340 includes a self-attention neural network 326 and a feedforward neural network 334. The self-attention neural networks 306, 326 allow the LLM 300 to weigh the importance of different words or tokens within the same input sequence (self-attention in the encoder 320) and between the input and output sequences (self-attention in the decoder 340), respectively.

In addition, the decoder 340 also includes an inter-attention or encoder-decoder attention neural network 330, which receives input from the output of the encoder 320. The encoder-decoder attention neural network 330 allows the decoder 340 to focus on relevant parts of the input sequence (output of the encoder 320) while generating the output sequence. As described below, the output of the encoder 320 is a continuous representation or embedding of the input sequence. By feeding the output of the encoder 320 to the encoder-decoder attention neural network 330, the contextual information and relationships captured in the input sequence (by the encoder 320) can be carried to the decoder 340. Such connection enables the decoder 340 to access to the entire input sequence, rather than just the last hidden state. Because the decoder 340 can attend to all words in the input sequence, the input information can be aligned with the generation of output to improve contextual accuracy of the generated text output.

In some examples, one or more of the attention neural networks (e.g., 306, 326, 330) can be configured to implement a single head attention mechanism, by which the model can capture relationships between words in an input sequence by assigning attention weights to each word based on its relevance to a target word. The term "single head" indicates that there is only one set of attention weights or one mechanism for capturing relationships between words in the input sequence. In some examples, one or more of the attention neural networks (e.g., 306, 326, 330) can be configured to implement a multi-head attention mechanism, by which multiple sets of attention weights, or "heads," in parallel to capture different aspects of the input sequence. Each head learns distinct relationships and dependencies within the input sequence. These multiple attention heads can enhance the model's ability to attend to various features and patterns, enabling it to understand complex, multi-faceted contexts, thereby leading to more accurate and contextually relevant text generation. The outputs from multiple heads can be concatenated or linearly combined to produce a final attention output.

As depicted in FIG. 3, both the encoder 320 and the decoder 340 can include one or more addition and normalization layers (e.g., the layers 308 and 312 in the encoder 320, the layers 328, 332, and 336 in the decoder 340). The addition layer, also known as a residual connection, can add the output of another layer (e.g., an attention neural network or a feedforward network) to its input. After the addition operation, a normalization operation can be performed by a corresponding normalization layer, which normalizes the features (e.g., making the features to have zero mean and unit variance), This can help in stabilizing the learning process and reducing training time.

A linear layer 342 at the output end of the decoder 340 can transform the output embeddings into the original input space. Specifically, the output embeddings produced by the decoder 340 are forwarded to the linear layer 342, which can transform the high-dimensional output embeddings into a space where each dimension corresponds to a word in the vocabulary of the LLM 300.

The output of the linear layer 342 can be fed to a softmax layer 344, which is configured to implement a softmax function, also known as softargmax or normalized exponential function, which is a generalization of the logistic function that compresses values into a given range. Specifically, the softmax layer 344 takes the output from the linear layer 342 (also known as logits) and transforms them into probabilities. These probabilities sum up to 1, and each probability corresponds to the likelihood of a particular word being the next word in the sequence. Typically, the word with the highest probability can be selected as the next word in the generated text output.

Still referring to FIG. 3, the general operation process for the LLM 300 to generate a reply or text output in response to a received prompt input is described below.

First, the input text is tokenized, e.g., by the input embedding unit 302, into a sequence of tokens, each representing a word or part of a word. Each token is then mapped to a fixed-length vector or input embedding. Then, positional encoding 304 is added to the input embeddings to retain information regarding the order of words in the input text.

Next, the input embeddings are processed by the self-attention neural network 306 of the encoder 320 to generate a set of hidden states. As described above, multi-head attention mechanism can be used to focus on different parts of the input sequence. The output from the self-attention neural network 306 is added to its input (residual connection) and then normalized at the addition and normalization layer 308.

Then, the feedforward neural network 310 is applied to each token independently. The feedforward neural network 310 includes fully connected layers with non-linear activation functions, allowing the model to capture complex interactions between tokens. The output from the feedforward neural network 310 is added its input (residual connection) and then normalized at the addition and normalization layer 312.

The decoder 340 uses the hidden states from the encoder 320 and its own previous output sequence to generate the next token in an autoregressive manner so that the sequential output is generated by attending to the previously generated tokens. Specifically, the output of the encoder 320 (input embeddings processed by the encoder 320) are fed to the encoder-decoder attention neural network 330 of the decoder 340, which allows the decoder 340 to attend to all words in the input sequence. As described above, the encoder-decoder attention neural network 330 can implement a multi-head attention mechanism, e.g., computing a weighted sum of all the encoded input vectors, with the most relevant vectors being attributed the highest weights.

The previous output sequence of the decoder 340 is first tokenized by the output embedding unit 322 to generate an output embedding for each token in the output sequence. Similarly, positional embedding 324 is added to the output embedding to retain information regarding the order of words in the output sequence.

The output embeddings are processed by the self-attention neural network 326 of the decoder 340 to generate a set of hidden states. The self-attention mechanism allows each token in the text output to attend to all tokens in the input sequence as well as all previous tokens in the output sequence. The output from the self-attention neural network 326 is added to its input (residual connection) and then normalized at the addition and normalization layer 328.

The encoder-decoder attention neural network 330 receives the output embeddings processed through the self-attention neural network 326 and the addition and normalization layer 328. Additionally, the encoder-decoder attention neural network 330 also receives the output from the addition and normalization layer 312 which represents input embeddings processed by the encoder 320. By considering both processed input embeddings and output embeddings, the output of the encoder-decoder attention neural network 330 represents an output embedding which takes into account both the input sequence and the previously generated outputs. As a result, the decoder 340 can generate the output sequence that is contextually aligned with the input sequence.

The output from the encoder-decoder attention neural network 330 is added to part of its input (residual connection), i.e., the output from the addition and normalization layer 328, and then normalized at the addition and normalization layer 332. The normalized output from the addition and normalization layer 332 is then passed through the feedforward neural network 334. The output of the feedforward neural network 334 is then added to its input (residual connection) and then normalized at the addition and normalization layer 336.

The processed output embeddings output by the decoder 340 are passed through the linear layer 342, which maps the high-dimensional output embeddings back to the size of the vocabulary, that is, it transforms the output embeddings into a space where each dimension corresponds to a word in the vocabulary. The softmax layer 344 then converts output of the linear layer 342 into probabilities, each of which corresponds to the likelihood of a particular word being the next word in the sequence. Finally, the LLM 300 samples an output token from the probability distribution generated by the softmax layer 344 (e.g., selecting the token with the highest probability), and this token is added to the sequence of generated tokens for the text output.

The steps described above are repeated for each new token until an end-of-sequence token is generated or a maximum length is reached. Additionally, if the encoder 320 and/or decoder 340 have multiple stacked layers, the steps performed by the encoder 320 and decoder 340 are repeated across each layer in the encoder 320 and the decoder 340 for generation of each new token.

Example Overall Method for Intelligent Handling of API Queries

Figure 4:
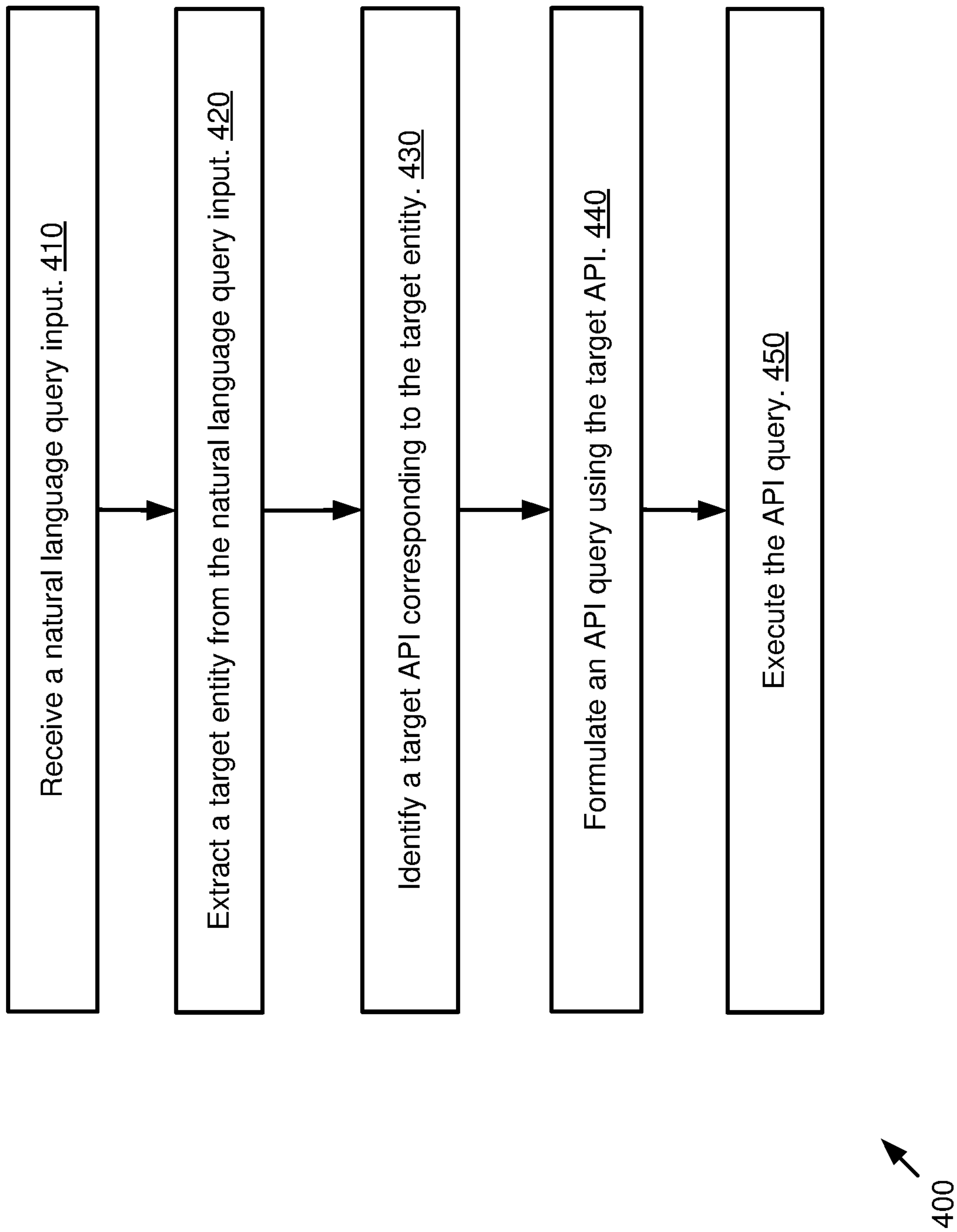
FIG. 4 is a flowchart illustrating an example overall method for implementing intelligent handling of API queries.

FIG. 4 is a flowchart illustrating an example overall method 400 for intelligent handling of API queries. The method 400 can be performed, e.g., by the tenant runtime environment 130 of FIG. 1.

At step 410, a natural language query input can be received, e.g., via the UI 136.

At step 420, a target entity can be extracted from the natural language query input. The extraction can be performed, e.g., by the parser 138, which can collaborate with the prompt generator 156 communicating with the generative AI model 170 or the LLM 250.

At step 430, a target API corresponding to the target entity can be identified, as described further below in reference to FIG. 5.

At step 440, an API query can be formulated using the target API. Formulation of the API query can be performed, e.g., by the API query generator 140, which can collaborate with the prompt generator 156 in communication with the generative AI model 170 or the LLM 250.

At step 450, the API query can be executed, e.g., by the executor 146, to generate a query output, which can be presented on the UI 136. In some examples, the API query can be first validated, e.g., by the validator 144, prior to its execution. In some examples, the query output can be transformed into a user-desired format, e.g., by using the generative AI model 170 or the LLM 250.

Figure 5:
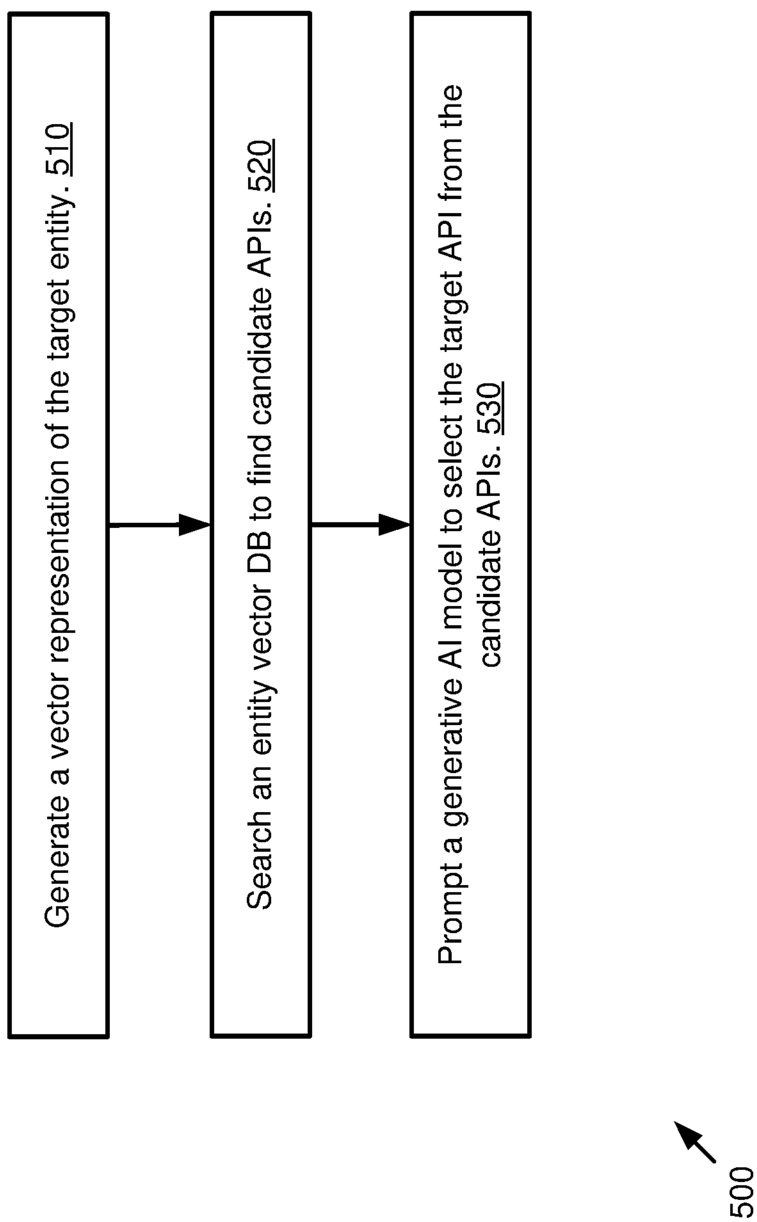
FIG. 5 is a flowchart illustrating an example method for identifying a target API corresponding to an entity.

FIG. 5 is a flowchart illustrating an example method 500 for identifying the target API.

At step 510, a vector representation of the target entity can be generated, e.g., by the embedding engine 154. This process involves transforming high-dimensional data into lower-dimensional vectors using various embedding techniques such as Word2Vec, GloVe, FastText, etc. These techniques capture semantic relationships between words or items based on their context or co-occurrence in a corpus.

At step 520, an entity vector database (e.g., the entity vector database 120) containing vector representations of a plurality of APIs can be searched. As described above, the entity vector database can be created by the embedding engine 118, which can transform metadata and/or documents of each API included in the API graph 116 into corresponding vector representations. Similarly, the vector representations of the APIs can capture semantic relationships between words or items within the API metadata and documents. These semantic relationships are based on the context or co-occurrence of words in the API descriptions (in the API metadata and/or the documents), thereby creating a semantic map of the API landscape. This allows for a more nuanced and context-aware search, enabling the system to find APIs that are semantically relevant to the target entity.

The searching can be performed, e.g., by the search engine 150. The searching can return one or more candidate APIs whose vector representations match or are most similar to the vector representation of the target entity. In some examples, a similarity score (e.g., cosine similarity, etc.) can be calculated to measure similarity between two vectors. In some examples, the top N matches (where N is a predefined integer) corresponding vectors with the highest similarity scores can be returned as candidate APIs.

A vector-based search is superior to a text-based search for matching APIs to a target entity because it captures the semantic relationships between words, not just their literal meaning. This allows for a more nuanced understanding of the API's functionality, making it possible to find matches that are contextually relevant, not just syntactically similar. Further, vector representations can handle synonyms and related terms more effectively, enhancing the robustness and accuracy of the search results. This is particularly beneficial in complex domains like API matching, where the same functionality might be described in different ways.

Then, at step 530, a generative AI model (e.g., the generative AI model 170 or the LLM 250) can be prompted to select the target API from the one or more candidate APIs. The prompting can be performed, e.g., by the prompt generator 156 using a predefined prompt template 158.

The methods 400, 500, and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example Method for Creating Entity Vector Database

Figure 6:
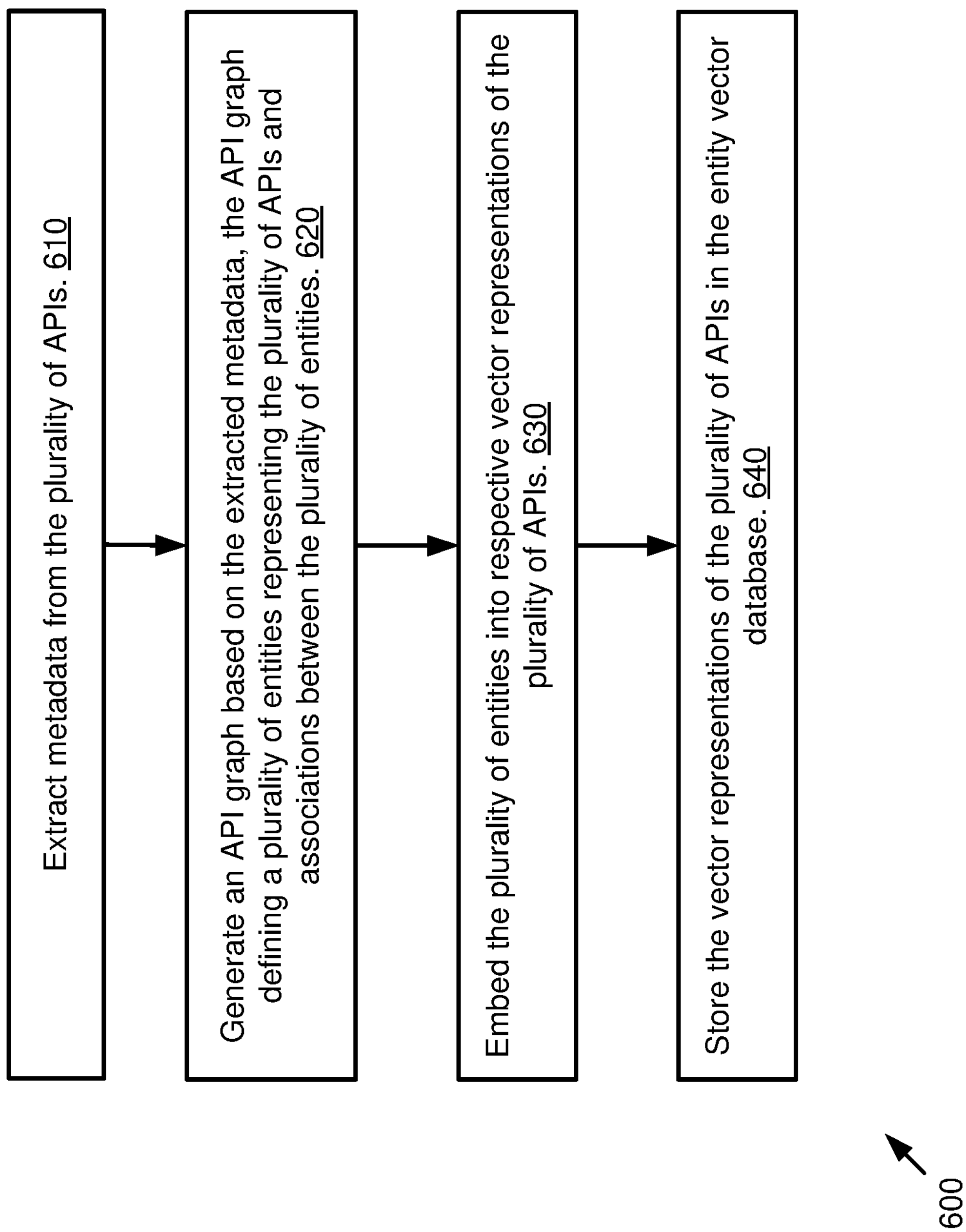
FIG. 6 is a flowchart illustrating an example method for creating an entity vector database.

FIG. 6 is a flowchart illustrating an example method 600 for creating an entity vector database (e.g., the entity vector database 120). The method 600 can be performed, e.g., by the design environment 110 of FIG. 1.

At step 610, metadata can be extracted from a plurality of APIs (e.g., the APIs included in the API repository 106), e.g., by the metadata extractor 112.

At step 620, an API graph (e.g., the API graph 116) can be generated, e.g., by the graph generator 114, based on the extracted API metadata. As described above, the API graph can define a plurality of entities representing the plurality of APIs and associations between the plurality of entities.

At step 630, the plurality of entities can be embedded, e.g., by the embedding engine 118, into respective vector representations of the plurality of APIs. As described above, such embedding can be implemented using various embedding techniques, such as Word2Vec, GloVe, FastText, etc. The embedding can transform high-dimensional data of the entities into lower-dimensional vectors. This transformation captures the semantic relationships between words or items based on their context or co-occurrence in a corpus, effectively encapsulating the essential characteristics of the APIs in a compact form.

In some examples, for each entity representing an API, two vector representations can be generated. Specifically, a first vector representation of the API can be generated based on metadata of the API, and a second vector representation of the API can be generated based on one or more documents associated with the API. For example, for a "Contract" entity representing an agricultural portal API, embedding metadata of the API can generate a first vector [0.123, 0.33, 2.45], whereas embedding support documents of the API can generate a second vector [0.153, 0.343, 0.44]. Note that the vector length is set to three for simplicity in this example. In practice, the vector length can be any predefined integers.

Then, at step 640, the vector representations of the plurality of APIs can be stored in the entity vector database, which can be deployed on or made available to the tenant runtime environment 130.

Example Data Sources of API Repository

During the design phase, the design environment can determine the sources of different APIs and API metadata and then structure the API metadata in an easy-to-read format. As described above, API metadata can be extracted from a plurality of APIs included in an API repository. The API repository may reside in a centralized location or be distributed across multiple sites. As described herein, the API repository serves as a comprehensive resource of available APIs, encompassing not only API code implementations but also essential supporting materials for the APIs, such as documents and illustrative examples detailing the usage of these APIs.

In some examples, data in the API repository can be collected and combined from multiple sources. One example data source is centralized or distributed API documentation hubs (e.g., the SAP Business Accelerator Hub provided by SAP SE of Walldorf, Germany), which can provide a comprehensive listing of APIs. These hubs may organize APIs into packages and offer references for various entities within each API. Additionally, these hubs may include detailed documentation on fields and entities, aiding in natural language mapping during runtime.

The user interfaces of different applications can also serve as reliable sources for API information included in the API repository. For example, when a user interacts with a user interface, automation tools (e.g., Selenium, etc.) can detect batch calls sent to the server. These batch calls contain API details and associated metadata. Descriptive labels on the user interface elements can provide valuable natural language descriptions for the APIs.

Another data source is service keys associated with various products (such as those on the Business Technology Platform provided by SAP SE of Walldorf, Germany). These service keys, whether automatically generated during application deployment or manually created by administrators, can contain important details about API endpoints and authentication mechanisms. As a result, service keys can serve as reliable sources for accessing information (including authentication mechanism) within the API ecosystem.

Example API Metadata

Access to the APIs included the API repository is enabled when the API endpoints and authentication mechanisms are available. For example, if the API endpoints are accessible, the metadata extractor 112 can extract API metadata such as entity names, field names, and association names for different entities that form part of an API. This extraction process can be applied to all the API endpoints available in the API repository. For instance, using the $metadata endpoint allows extraction of the entire metadata of a "Commodity" API in an EDMX document 700 as part of an OData service, as shown in FIG. 7.

In some examples, the metadata extractor 112 can further extract EDMX metadata and convert it into a simplified JSON format, eliminating redundant values. This transformation can result in a normalized data structure which can be easily passed into a prompt template (e.g., the prompt template 158). An example data structure of an API can have the following JSON formation:

```
[
  {
    "Entity Name": "",
    "Properties": [ ],
    "Associations": [ ],
    "Actions": [
        {
          "Parameters": [ ]
        }
      ]
  }
]
```

An example API data structure 800 in JSON format is shown in FIG. 8. In this example, the data structure 800 defines an entity representing the "TradingContractHeader" API. This API includes a list of attributes or properties, such as "TradkingContractNumber," "TradingContractType," "ContractStatus," etc. Additionally, the "TradingContractHeader" entity is associated with several other entities representing related APIs, such as "ContractHeaderFee," "ContractHeaderText," etc. In some examples, an association can be inferred from the "NavigationProperty Name" field in the EDMX metadata. This association signifies a relationship between different entities/APIs. For instance, calling an associated API allows retrieving values for a property of the current API through this relationship. Furthermore, the data structure 800 specifies API actions (e.g., "CreateContractFromBid") along with their corresponding parameters. In some examples, the API data structure can have additional fields, such as API endpoints, etc.

Example API Graph

To enable generating correct API syntax during runtime query phase, metadata for all the different APIs should be readily available and easily comprehensible by LLM. An API graph depicting different APIs and their relationship is suitable for such scenarios. As described above, the graph generator 114 can generate the API graph based on API metadata. The API graph can include a plurality of entities representing respective APIs and define associations between those entities/APIs. The entities can be represented by nodes, and the associations between the entities can be represented as edges which connect related entities.

Figure 9:
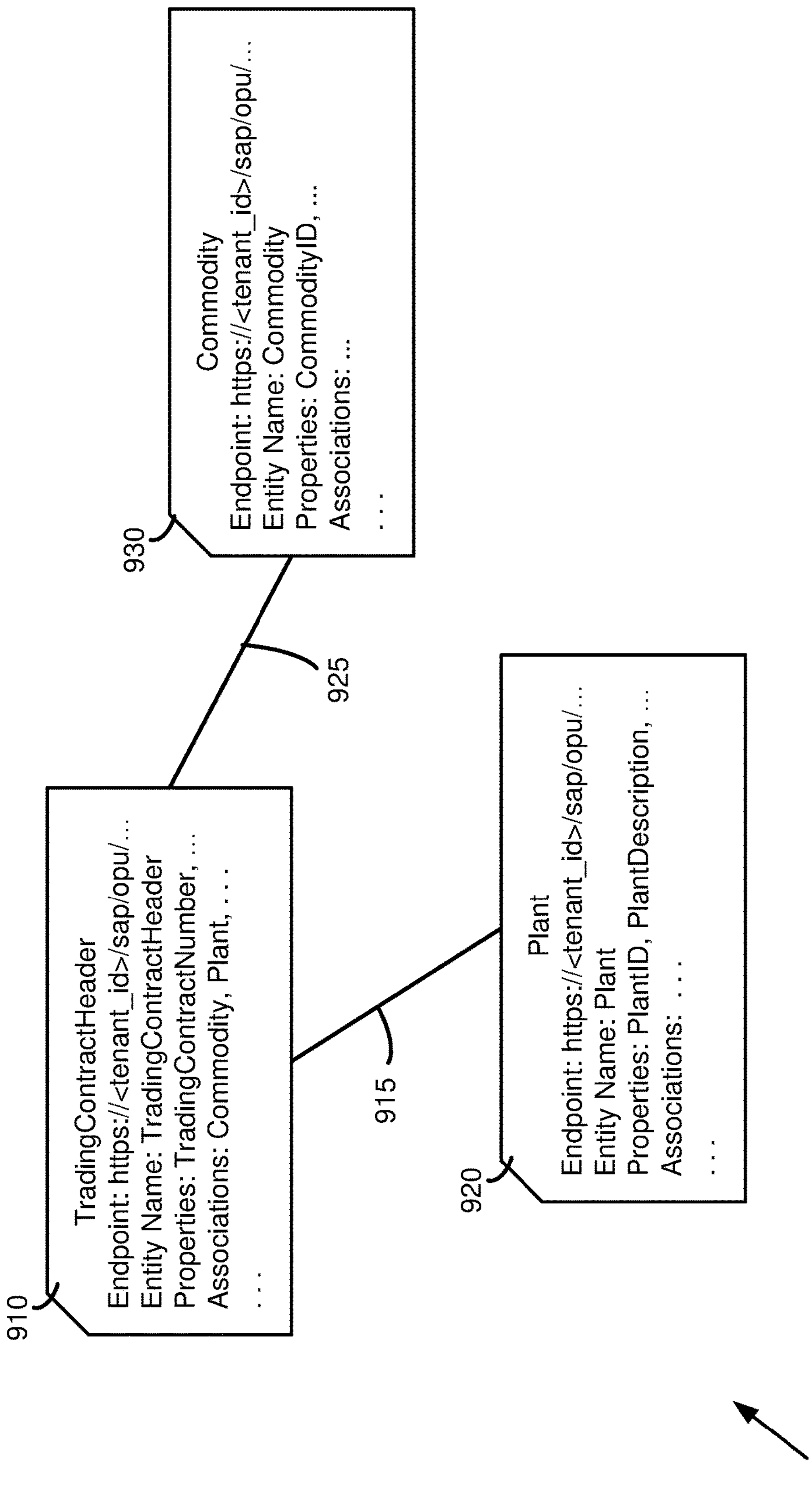
FIG. 9 depicts a portion of an example API graph.

As an example, FIG. 9 shows a portion of an API graph 900, which includes nodes 910, 920, and 930 corresponding to three entities, which respectively represent three different APIs: "TradingContractHeader," "Plant," and "Commodity." Each node can include a corresponding API data structure (e.g., similar to the API data structure 800) containing extracted API metadata, such as API endpoint, properties, associations, etc. For example, the data structure of included in the node 910 indicates that the "TradingContractHeader" API is associated with both the "Plant" API and the "Commodity" API. Thus, the node 910 is connected to the node 920 by an edge 915, and the node 910 is connected to the node 930 by another edge 925.

In some examples, API documentations and/or sample values for the APIs can also be included in the API graph. For example, a node or entity in the API graph can include a description field which includes text descriptions of the API (e.g., describing purpose, functionality, and usage of the API) and/or references which are linked to related API documents (e.g., including comprehensive guidance on how to interact with or use the API). As another example, a node or entity in the API graph can include a sample data field which includes example values that can serve as input for various properties and/or parameters of the API. In some examples, mock data specifically tailored for the API can be generated, and these mock data (or the links to the mock data) can be included in the sample data field.

Incorporating mock data for sample queries can be helpful to improve the performance of formulating API queries during runtime query phase, particularly by leveraging the LLM, e.g., by including these mock data samples alongside the prompts. In some examples, specific tools can be employed to generate mock data which aligns with the data structure of the API. As an example, FIG. 10 depicts some mock data 1000 generated by running the following mock query:

```
http://xxx.com/sap/opu/odata4/sap/api__acmtradingcontract/srvd__a2x/sap/api__acmtrad
ingcontract/0001/TradingContractHeader('186170')?sap-
client=310&$expand=__ContractItem($expand=__QuantityTypes)&$format=json
```

Example Method for Creating Value Vector Database

As described above, during the deployment phase, a value vector database can be created based on an API input repository that stores tenant-specific values that can be used as input to various APIs. The data storage space for the value vector database can be allocated or enabled in the design phase.

Maintaining an API input repository with tenant-specific values is important to ensure smooth and accurate interactions between the user and the tenant runtime environment. This is because user-entered parameter values, especially those in natural language, may not always align with the standard input values recognized by the tenant system. For instance, different tenants may have varying standard values for the same API parameter, such as "United States" or "USA" for the "Country" parameter. Similarly, an API parameter like "material" could accept a set of values defining metals (e.g., "copper," "aluminum," etc.) for one tenant but a different set of values defining agricultural products (e.g., "corn," "soybean," etc.) for another tenant. By storing these tenant-specific input values in an API input repository, a value vector database can be created by embedding these input values into vector representations. This process facilitates the mapping of user-entered values to standard input values, as described further below.

Figure 11:
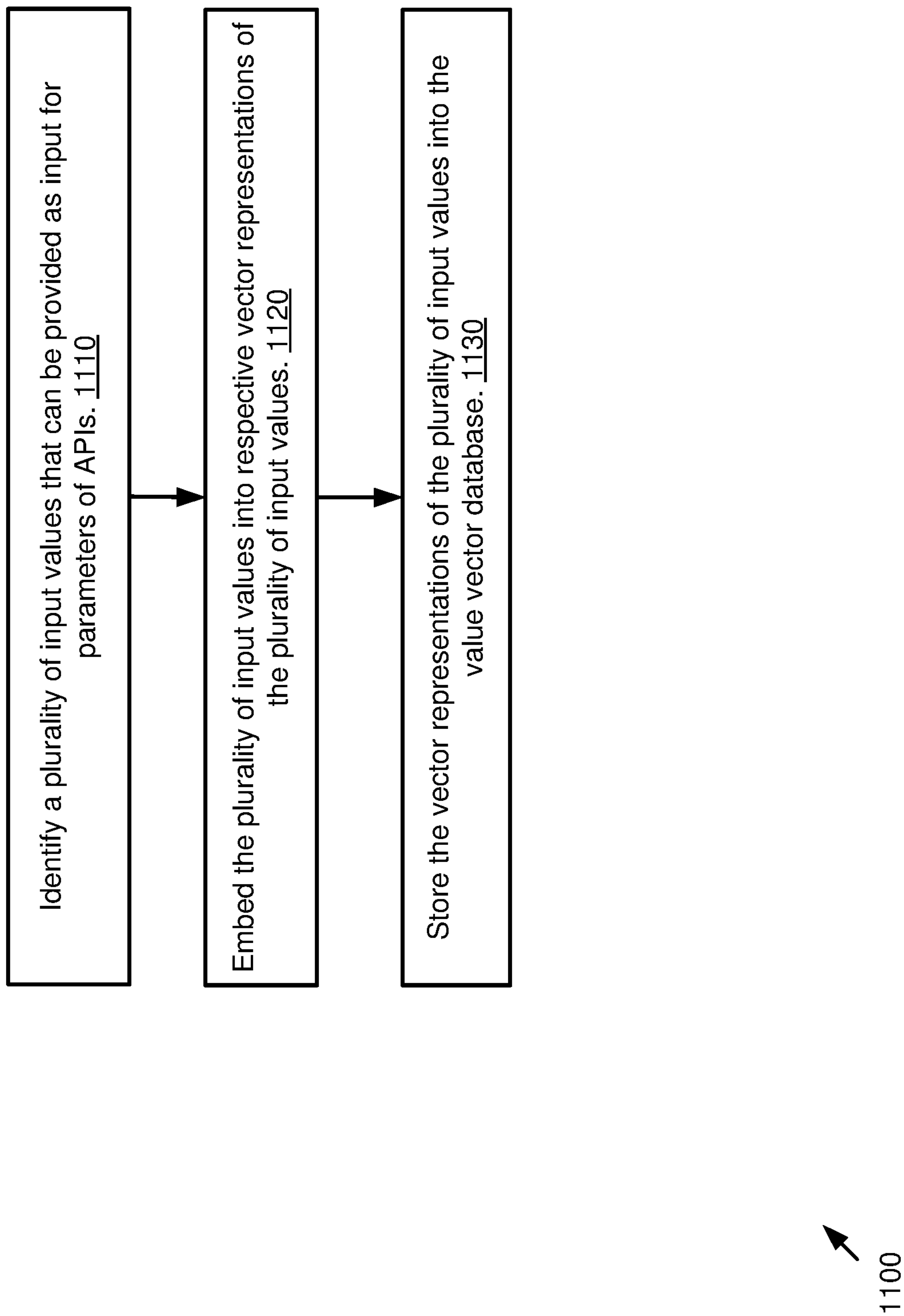
FIG. 11 is a flowchart illustrating an example method for creating a value vector database.

FIG. 11 is a flowchart illustrating an example overall method 1100 for creating the value vector database. The method 1100 can be performed, e.g., by the embedding engine 154 of FIG. 1.

At step 1110, a plurality of input values that can be provided as input for parameters of available APIs can be identified. The plurality of input values can be tenant-specific and defined in tenant databases. The identified input values, including metadata of the input values (e.g., text descriptions of the input values), can be maintained in a tenant-specific API input repository.

At step 1120, the plurality of input values can be embedded into respective vector representations of the plurality of input values. Embedding can be performed using various techniques, such as word2vec, GloVe, etc., which convert the input values into a compact vector representation. The embedding captures the semantic meaning of the input values by analyzing their context within the tenant databases, thus transforming them into a form that machines can understand and process efficiently.

In some examples, for each input value, two vector representations can be created. Specifically, a first vector representation of the input value can be generated based on a unique identifier of the input value, and a second vector representation can be generated based on a text description of the input value. For example, the table below shows two materials with different material identifiers (IDs) and descriptions. The material IDs are tenant-specific input values that can be used as input for a "material" parameter of an API.

| Material ID | Description |
|---|---|
| M12345 | Widget A - Small, Blue |
| P7890 | Power Supply Unit - 500 W |

For each material, a material ID vector and a description vector can be created, as exemplified in the following table. Note that the vector length is set to three for simplicity in this example. In practice, the vector length can be any predefined integers.

| Material ID | Material ID Vector | Description Vector |
|---|---|---|
| M12345 | (.001, .045, 0.333) | (0.213, 1.455, 4.333) |
| P7890 | (.031, .055, 0.445) | (0.913, 1.555, 4.678) |

Then, at step 1130, the vector representations of the plurality of input values can be stored into the value vector database.

Example Method for API Input Value Mapping

Figure 12:
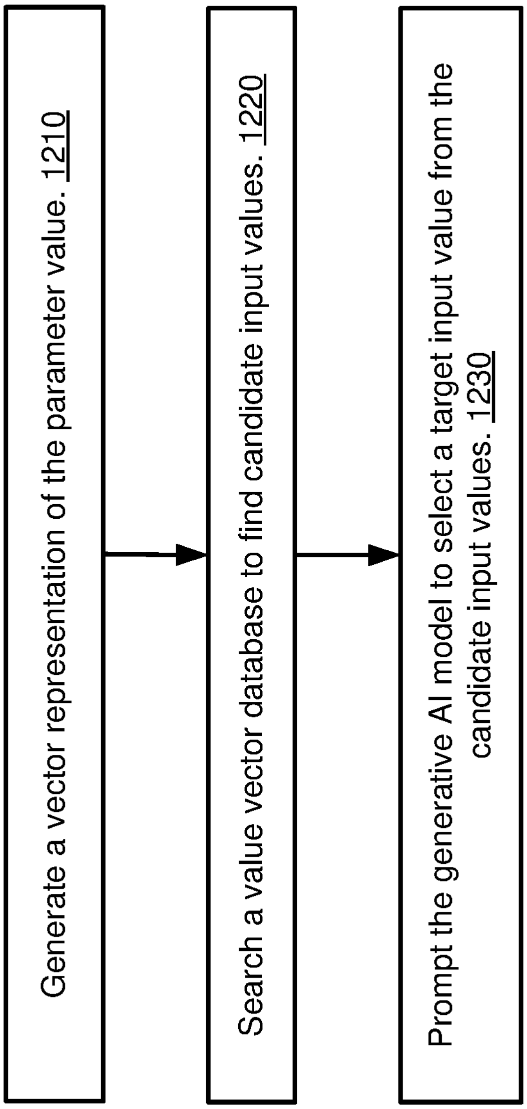
FIG. 12 is a flowchart illustrating an example method for mapping an input value for an API.

During the runtime query phase, parameter values entered by a user can be mapped to standard input values defined in the tenant-specific API input repository. FIG. 12 is a flowchart illustrating an example method 1200 for performing API input value mapping.

At step 1210, a vector representation of the parameter value can be generated, e.g., by the embedding engine 154.

At step 1220, a search can be performed against the value vector database containing vector representations of the API input values. The search can be performed, e.g., by the search engine 150. The search can return one or more candidate input values whose vector representations match or are most similar to the vector representation of parameter value. In some examples, a similarity score (e.g., cosine similarity, etc.) can be calculated to measure similarity between two vectors. In some examples, the top M matches (where M is a predefined integer) corresponding vectors with the highest similarity scores can be returned as candidate input values.

Vector-based search is often more efficient and accurate than direct comparison between use-entered parameter value and tenant-specific input values stored in the API input repository. This is because vector representations can capture the semantic meaning of the parameter values, allowing for a more nuanced comparison. For instance, two parameter values that are spelled differently but have similar meanings would be considered different in a direct comparison, but a vector-based search could recognize their similarity. This makes vector-based search particularly useful in handling synonyms, misspellings, and other variations in the parameter values. It also allows for a ranking of results based on similarity scores, providing a more flexible and robust matching process.

Then, at step 1230, a generative AI model (e.g., an LLM) can be prompted to select a target input value from the one or more candidate input values. In other words, the parameter value entered by the user can be mapped to the target input value, which can be provided as an input value for a corresponding API parameter.

Example Prompt Templates

As described above, during the runtime query phase, a tenant user can interact with the tenant runtime environment, e.g., by entering natural language query input through a chat interface. A number of steps can be performed sequentially after receiving the user's natural language query input. First, the user's natural language query input is parsed to understand the user's intent, and to identify an entity, parameters, and parameter values, if any. Next, an appropriate API that corresponds to the user-specified entity can be identified. The parameter values entered by the user can be mapped to tenant-specific input values that the API can understand. Then, the syntax of an API query is constructed. The constructed API query can be validated for any errors or inconsistencies. If the API query passes the validation check, it can then be executed. Finally, an output based on the results of the executed query can be generated, and the query output can be presented to the user in a desired format. This systematic process ensures that the user's query is understood, processed, and answered accurately and efficiently. Several steps of this process can be facilitated by a generative AI model, such as the LLM 250.

For example, the process beings by extracting relevant context from the user's natural language query input. To this end, the user's natural language query input can be used to generate one or more prompts, which instruct the LLM to extract relevant context from the natural language query input. Example context data includes intent of the user (e.g., (e.g., read or create/update/delete), entities representing APIs (e.g., contract, material, sales order, purchase order, etc.), parameters and parameter values related to the entities. This process can be guided by specific prompt templates. In some examples, multiple templates can be used to generate multiple prompts, which can be sent to the LLM sequentially.

For example, the following prompt template can be used to identify intent of the user:

```
intent_identification_template_prompt= """ You are given the user entered input in the form of string in double backticks "{userQuery}". \
Your task is to identify the user's intent. The intent could be reading, creating, updating, or deleting something.
Do not give code or any explanatory text, just give the intent output. \
"""
```

As another example, the following prompt template can be used to identify entities from the user's input. The user specified entities can represent corresponding APIs.

```
api__identification__template__prompt= """ You are given entities in the form of string in
double backticks "{userQuery}". \
You are also given a list of API names in triple backticks ""{api__names}""
Your task is to identify from the list of API Names the API which is the most probable one
to get the results corresponding to the user's query. \
You first scan the user query and understand what user wants to do and then identify the
relevant API accordingly. \
Do not give code or any explanatory text, just give the API Name as output. \
Example 1: List of APIs: Finance Documents, Sales Orders, and Planning Documents.
User's Query: Give me abc detail for SO xyz. In this, the most appropriate API is Sales
Orders. \
"""
```

As yet another example, the following prompt template can be used to identify parameters and parameter values from the user's input:

```
input__pair__gen__template = """ You are given a user query in the form of string in double
backticks "{userQuery]}". \
Your task is to identify from the user query, intended input value pairs. \
You first scan the user query and understand what element user wants to enter input in and
what value is user wants to enter in the element. \
Do not give code or any explanatory text, just give the element and the input value pair in
json format. \
It is not necessary that appropriate input value pairs found within the user's query, in that
case do not return anything. \
Example 1: User's Query: Give me abc detail for document xyz. In this element is
document and input are xyz. \
Example 2: User's Query: Give me total number of documents in the system. In this no
element and input are specified. \
Example 3: User's Query: Give me abc detail for documents with document type invoice.
In this element is document type and input are invoice. \
Return a json array for element and input__value pair.
"""
```

As described above, the entity extracted from the user's natural language query input can be converted into a vector representation. Then, N candidate APIs can be identified by searching the entity vector database to find top N matches for this vector representation, wherein N is a predefined integer. The LLM can be used to select a target API from these N candidate APIs. Among the N candidate APIs, the selected target API is semantically most suitable for the entity extracted from the user's natural language query input. As an example, the following prompt template can be used to identify the target API from a plurality of candidate APIs:

```
entity__identification__template__prompt= """ You are given a user query in the form of
string in double backticks "{userQuery}". \
You are also given a list of Entities and their metadata in json format in triple backticks
""{indentified__api__json}""
Your task is to identify from the list of Entities, the entities and fields which are the most
probable one to get the results corresponding to the user's query. \
You first scan the user query and understand what user wants to do and then identify the
relevant Entity accordingly. \
Do not give code or any explanatory text, just give the main Entity, only its relevant
properties, associations, and actions, associated entity and its properties as output in json
format. \
Examples:
  Entities: \
  __Authors \
  AuthorID (Key) \
  Name \
  BirthDate \
  __Books \
  BookID (Key) \
  Title \
  PublicationDate \
  AuthorID (Foreign Key to Authors) \
  Example Queries and API Syntax: \
  Query with $count: \
  User Query: Count the number of authors. \
  OData API Request: https://xyz.com/Authors/$count \
  Main Entity: Authors, Relevant Fields: No fields. No association. No actions.
```

-continued

```
Query with $expand: \
User Query: Get all books with their authors. \
OData API Request: https://xyz.com/Books?$expand=Author \
Main Entity: Books, Relevant Fields: BookID. _Authors association. No actions.
Associated Entity: Author, Relevant Fields: All fields in Author.
Query with $filter within $expand: \
User Query: Get books written by authors born after 1980. \
OData API Request: https://xyz.com/Books?$expand=Author($filter=BirthDate ge
1980-01-01) \
Main Entity: Books, Relevant fields BookID. _Authors association. No actions.
Associated Entity: Author, Relevant Fields: Title.
Query with Parent Entity filtered by Child Entity property: \
User Query: Get the count of authors who have written at least one book with a title
containing "OData". \
OData API Request: /Authors/$count? $filter=Books/any (b contains(b/Title,
'OData')) \
Main Entity: Books, no fields in books. _Authors association. No actions. \
Associated Entity: Author, Relevant Fields: Title. \
Count of Parents Based on Child Existence: \
User Query: Count the number of authors who have written at least one book. \
OData API Request: /Authors/$count?$filter=Books/any(b: b/BookID ne null) \
Main Entity: Books, no fields in books. _Authors association. No actions.
Associated Entity: Author, Relevant Fields: BookID.
Query with Expand and Amount/Currency Filter: \
User Query: Get authors and their books where the book's price is above $50. \
OData API Request: /Authors?$filter=Books/any(b: b/Price gt 50 and b/Currency eq
'USD') \
Main Entity: Author, no fields in author. _Books association. No actions.
Associated Entity: Book, Relevant Fields: Price and Currency.
Note that currency has been used explicitly with price/amount fields.
"""
```

Similarly, each parameter value extracted from the user's natural language query input can be converted into a vector representation. As described above, M candidate input values can be identified by searching the value vector database to find top M matches for the vector representation, wherein M is a predefined integer. The LLM can be used to select a target input value from the M candidate input values. Among the M candidate input values, the selected target input value is semantically most suitable for the parameter value extracted from the user's natural language query input. As an example, the following prompt template can be used to identify the target input value from a plurality of candidate input values:

```
exact_input_prompt = """You are given a json list of values {filtered_json} which is in
json format, which contains all the possible input values for value help.
You are also given an input value: {input_value}, which is intended to be entered as an
input.
Your task is to find the most appropriate value (only one), from the list of values that
matches the input.
If the input value does not match anything in the list, return the input value itself.
Do not give code or any explanatory text, just give the most appropriate value as output
(usually a single word).
"""
```

After the target API and target input values are identified, an API query with appropriate query syntax can be formulated. As an example, the following prompt template can be used to generate GET queries for OData V4 requests. In some examples, a few shot examples can be passed to the LLM to improve the accuracy.

```
query_generation_template = """You are given a sample OData request delimited by
double backticks "{odataRequest}" and \
entity structure delimited by triple backticks "'{entityStructure}"'\
You are also given a user query delimited by four backticks: ""{userQuery}"" which
consists of the information, \
```

-continued

```
you need to give the OData API request that is required to be triggered to get the output
desired by the user.
Try to optimize the query by selecting only fields which are required for user's query. \
For filter values, consider the values provided for each entity in five backticks rather than
actual values provided in user's query: `````{inputValues}````` \
Hint1: The count related queries (where the question is how many) the ODATA API looks
like: 'http://sample.com/$count'', \
Please note very seriously that queries with /$count do not accept additional parameters
except $filter and $expand. Do no add $select in these queries.
For queries where count is required based on child/association property, the following
format can be used /Authors/$count?$filter=Books/any(b: b/Price gt 50 and b/Currency eq
'USD')
Hint2: Avoid queries where $count = true is involved as the payload returned too large to
process instead all queries related to count should end with /$count. \
Hint3: For date fields in filter criteria, there is no formatting required. They can be used
without single/double quotes for comparison like: \
date ge 1999-01-01 or date lt 1999-01-01 \
Just return the OData Request URL without any encoding like " etc and nothing else. \
DO NOT give any preceding and succeeding text in the query. If the query is
http://abc.com. \
Just return 'http://abc.com'. \
Do not give any other explanatory text or code or anything else. \
Examples:
  Entities: \
  Authors \
  AuthorID (Key) \
  Name \
  BirthDate \
  Books \
  BookID (Key) \
  Title \
  PublicationDate \
  AuthorID (Foreign Key to Authors) \
  Price \
  Currency \
  Example Queries and API Syntax: \
  Basic Query: \
  User Query: Get all books.\
  OData API Request: https://xyz.com/Books \
  Query with $count: \
  User Query: Count the number of authors. \
  OData API Request: https://xyz.com/Authors/$count \
  Query with $expand: \
  User Query: Get all books with their authors. \
  OData API Request: https://xyz.com/Books?$expand=Author \
  Query with $filter within $expand: \
  User Query: Get books written by authors born after 1980. \
  OData API Request: https://xyz.com/Books?$expand=Author($filter=BirthDate ge
1980-01-01) \
  Query with Parent Entity filtered by Child Entity property: \
  User Query: Get the count of authors who have written at least one book with a title
containing "OData". \
  OData API Request: /Authors/$count?$filter=Books/any(b: contains(b/Title, 'OData')) \
  Count of Parents Based on Child Existence: \
  User Query: Count the number of authors who have written at least one book. \
  OData API Request: /Authors/$count?$filter=Books/any(b: b/BookID ne null) \
  Query with Expand and Amount/Currency Filter: \
  User Query: How many authors have books where the book's price is above $50. \
  OData API Request: /Authors/$count?$filter=Books/any(b: b/Price gt 50 and
b/Currency eq 'USD') \
"""
```

Similarly, PUT, POST, and DELETE requests can be prepared for create, update, delete (CUD) operations. When executing PUT or POST requests, it is needed to include a payload with the API query. This payload, which is typically formatted in JSON or XML, contains field values that need to be mapped accordingly. The process begins by preparing a payload structure using the API graph (which contains data structure of the API query). Then, input values corresponding to various fields of the payload structure (e.g., properties or parameters of the API) can be identified using the same input value identification method described above. As an example, FIG. 13 depicts an example "Actions" payload 1300 with input values.

The generated API query can be validated, and then executed using pre-configured credentials to generate query results. Any error responses generated during validation and execution can be captured and processed accordingly. In some examples, the original query results can be passed to the LLM to prepare the answer in a user-desired format. For example, the following prompt template can be used to format the query output:

```
output__generation__template = """You are given a sample OData response delimited by
double backticks "{api__response}" \
You are also given a user query delimited by triple backticks: '''{userQuery}''' which
consists of the information, \
You need to figure out the exact response to the user's query from the OData response. \
Do not give code or any explanatory text, just present the output and answer the user's
query in a polite and formal way.\
"""
```

Although specific prompts are described above, it should be understood that these prompts are merely examples for illustration purposes, and different prompts can be used based on the principles described herein.

Example Use Case

An example use case is described to illustrate intelligent API handling technologies describe herein. After the design phase and deployment phase, a tenant user can interact with the tenant runtime environment through a user interface.

For example, the user can type the following natural language query input: "Show me the Contracts for goods Soy for the month of April 2023." The user entered natural language query input can be parsed to extract context data (e.g., by prompting the LLM), as described above. For instance, the parser may determine that the intent of the user is to get information, i.e., to execute a read query (in contrast to a create, update, or delete query). Based on the natural language query input, the parser can also identify an entity "Contracts," which has two input parameters "Commodity" and "Month," with corresponding parameter values "Soy" and "April."

The extracted entity "Contracts" can be converted into a vector representation, based on which multiple candidate APIs can be identified by searching the entity vector database. Then, a target API named "Contract" can be selected from those candidate APIs by prompting the LLM, as described above. Metadata of the target API can be obtained from the corresponding API graph, as exemplified in FIG. 14. For example, it can be determined from the API metadata 1400 that the endpoint of the "Contract" API is /sap/opu/odata4/sap/api_acmtradingcontract/srvd_a2x/sap/api-_acmtradingcontract/0001/TradingContractHeader. Additionally, it can be determined that attributes of the "Contract" API includes "Commodity," "DeliveryPeriodStart," and "DeliveryPeriodEnd," and that the "Contract" API is associated with other APIs such as "Commodity" and "Plant."

The extracted parameter values "Soy" and "April" can be converted into respective vector representations, based on which multiple candidate input values can be identified for each parameter value by searching the value vector database. Then, corresponding target input values can be obtained by prompting the LLM, as described above. For instance, the parameter value "Soy" can be mapped to a target input value "Soybean" for the "Commodity" attribute of the "Contract" API, and the parameter value "April" can be mapped to two target input values "Apr. 1, 2023" and "Apr. 30, 2023" respectively corresponding to the "DeliveryPeriodStart" and "DeliveryPeriodEnd" attributes of the "Contract" API.

Based on the identified target API (e.g., "Contract") and target input values (e.g., "Soybean," "Apr. 1, 2023," and "Apr. 30, 2023"), the following API query can be formulated, e.g., by prompting the LLM, as described above (note that configuration information such as tenant-specific domain name is added to the API endpoint):

https://<tenant_id>/sap/opu/odata4/sap/api_acmtrading-contract/srvd_a2x/sap/api_acmtradingcontract/0001/TradingContractHeader?$filter=Commodity eq 'Soyabean' and DeliveryPeriodStart ge 2023-04-01 and DeliveryPeriodEnd le 2023-04-30&$format=json.

The above API query can be first validated, and then executed, to generate query results. For example, FIG. 15 shows a portion of a sample query output 1500, which includes at least two records (with Contract Id=1 and Contract Id=5) organized in JSON format.

Then, the query output 1500 can be converted into a user-desired format, e.g., by prompting the LLM, as described above. For instance, the query output 1500 in JSON format depicted in FIG. 15 can be converted into the following easy-to-read table format, which is presented to the user:

| Contract Number | Commodity | Delivery Period Start Date | Delivery Period End Date |
|---|---|---|---|
| 1 | Soyabean | Apr. 1, 2023 | Apr. 20, 2023 |
| 5 | Soyabean | Apr. 5, 2023 | Apr. 25, 2023 |

Example Advantages

The technologies described herein offer a multitude of advantages, particularly when compared to traditional approaches. As described above, traditional methods, such as retrieving information via a user interface or directly entering queries, often fall short in the face of complex systems. Specifically, user interfaces are generally not optimized for complex analytical queries and lack the necessary structures for efficient querying. Direct API calls, while bypassing these limitations, require users to have a deep understanding of SQL queries, API endpoints, query parameters, and data structures, which can be a significant hurdle for those without technical proficiency.

In contrast, the integration of LLMs and API metadata provides a robust solution to these challenges. The technologies described herein allow for the leveraging of semantically rich API metadata to answer user queries in natural language (e.g., the user does not need to know the endpoints and/or syntax of relevant APIs), thereby enhancing the precision of responses and the overall user experience. Importantly, this approach considers the security of sensitive business data, as the LLMs only determine the appropriate APIs and input values to the APIs to prepare OData queries, without needing access to the actual data.

The fusion of LLMs with API metadata, as described herein, enables businesses to build highly effective and intuitive query response systems. This not only can improve their understanding of user inquiries but also allows them to produce precise responses and perform actions. The systematic form of API metadata is particularly advantageous for LLMs, enabling them to retrieve real-time information for formulating API queries and payloads, and to create dynamic responses.

The technologies described herein also offer a unique advantage in handling tenant-specific query inputs. Specifically, they address the common issue of mismatch between user-entered parameter values and standard input values recognized by the tenant system (e.g., by converting user inputs into vector representations and matching them with standard input values stored in a value vector database). This ensures the API query receives a valid, tenant-specific input value, enhancing the precision and relevance of responses.

In summary, the technologies described herein provide a powerful, secure, and efficient alternative to traditional data querying methods. They offer a promising avenue for enhancing user interaction and communication, overcoming the limitations of traditional approaches, and revolutionizing the way businesses interact with their customers and users.

Example Computing Systems

Figure 16:
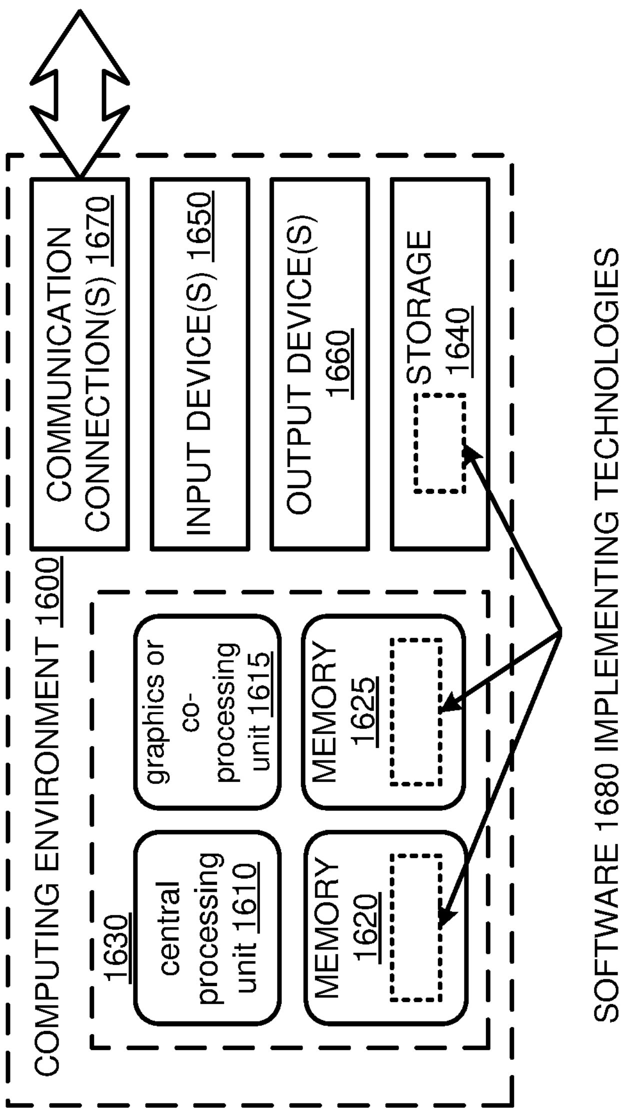
FIG. 16 is a block diagram of an example computing system in which described embodiments can be implemented.

FIG. 16 depicts an example of a suitable computing system 1600 in which the described innovations can be implemented. The computing system 1600 is not intended to suggest any limitation as to scope of use or functionality of the present disclosure, as the innovations can be implemented in diverse computing systems.

With reference to FIG. 16, the computing system 1600 includes one or more processing units 1610, 1615 and memory 1620, 1625. In FIG. 16, this basic configuration 1630 is included within a dashed line. The processing units 1610, 1615 can execute computer-executable instructions, such as for implementing the features described in the examples herein (e.g., the methods 400, 500, 600, 1100, and 1200). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 16 shows a central processing unit 1610 as well as a graphics processing unit or co-processing unit 1615. The tangible memory 1620, 1625 can be volatile memory (e.g., registers, cache, RAM), non-volatile memory (e.g., ROM, EEPROM, flash memory, etc.), or some combination of the two, accessible by the processing unit(s) 1610, 1615. The memory 1620, 1625 can store software 1680 implementing one or more innovations described herein, in the form of computer-executable instructions suitable for execution by the processing unit(s) 1610, 1615.

A computing system 1600 can have additional features. For example, the computing system 1600 can include storage 1640, one or more input devices 1650, one or more output devices 1660, and one or more communication connections 1670, including input devices, output devices, and communication connections for interacting with a user. An interconnection mechanism (not shown) such as a bus, controller, or network can interconnect the components of the computing system 1600. Typically, operating system software (not shown) can provide an operating environment for other software executing in the computing system 1600, and coordinate activities of the components of the computing system 1600.

The tangible storage 1640 can be removable or non-removable, and includes magnetic disks, magnetic tapes or cassettes, CD-ROMs, DVDs, or any other medium which can be used to store information in a non-transitory way and which can be accessed within the computing system 1600. The storage 1640 can store instructions for the software implementing one or more innovations described herein.

The input device(s) 1650 can be an input device such as a keyboard, mouse, pen, or trackball, a voice input device, a scanning device, touch device (e.g., touchpad, display, or the like) or another device that provides input to the computing system 1600. The output device(s) 1660 can be a display, printer, speaker, CD-writer, or another device that provides output from the computing system 1600.

The communication connection(s) 1670 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 17:
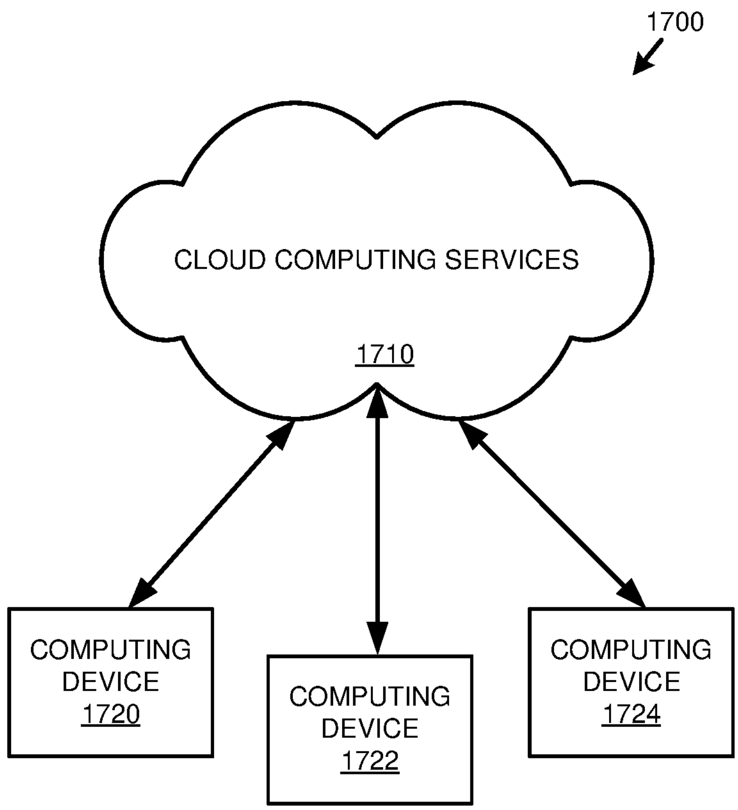
FIG. 17 is a block diagram of an example cloud computing environment that can be used in conjunction with the technologies described herein.

FIG. 17 depicts an example cloud computing environment 1700 in which the described technologies can be implemented, including, e.g., the system 100 and other systems herein. The cloud computing environment 1700 can include cloud computing services 1710. The cloud computing services 1710 can comprise various types of cloud computing resources, such as computer servers, data storage repositories, networking resources, etc. The cloud computing services 1710 can be centrally located (e.g., provided by a data center of a business or organization) or distributed (e.g., provided by various computing resources located at different locations, such as different data centers and/or located in different cities or countries).

The cloud computing services 1710 can be utilized by various types of computing devices (e.g., client computing devices), such as computing devices 1720, 1722, and 1724. For example, the computing devices (e.g., 1720, 1722, and 1724) can be computers (e.g., desktop or laptop computers), mobile devices (e.g., tablet computers or smart phones), or other types of computing devices. For example, the computing devices (e.g., 1720, 1722, and 1724) can utilize the cloud computing services 1710 to perform computing operations (e.g., data processing, data storage, and the like).

In practice, cloud-based, on-premises-based, or hybrid scenarios can be supported.

Example Implementations

In any of the examples herein, a software application (or "application") can take the form of a single application or a suite of a plurality of applications, whether offered as a service (SaaS), in the cloud, on premises, on a desktop, mobile device, wearable, or the like.

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

In any of the examples described herein, an operation performed in runtime means that the operation can be completed in real time or with negligible processing latency (e.g., the operation can be completed within 1 second, etc.).

Example Clauses

Any of the following example clauses can be implemented.

Clause 1. A computing system comprising: memory; one or more hardware processors coupled to the memory; and one or more computer readable storage media storing instructions that, when loaded into the memory, cause the one or more hardware processors to perform operations comprising: receiving a natural language query input from a user interface; extracting a target entity from the natural language query input; identifying a target application programming interface (API) corresponding to the target entity; formulating an API query using the target API; and executing the API query to generate a query output on the user interface, wherein identifying the target API comprises: generating a vector representation of the target entity; searching an entity vector database containing vector representations of a plurality of APIs, wherein the searching returns one or more candidate APIs whose vector representations match the vector representation of the target entity; and prompting a generative artificial intelligence (AI) model to select the target API from the one or more candidate APIs.

Clause 2. The computing system of clause 1, wherein the operations further comprise creating the entity vector database, wherein creating the entity vector database comprises: extracting metadata from the plurality of APIs; generating an API graph based on the metadata extracted from the plurality of APIs, wherein the API graph defines a plurality of entities representing the plurality of APIs and associations between the plurality of entities; embedding the plurality of entities into respective vector representations of the plurality of APIs; and storing the vector representations of the plurality of APIs in the entity vector database.

Clause 3. The computing system of clause 2, wherein embedding an entity representing an API comprises generating a first vector representation of the API based on metadata of the API and generating a second vector representation of the API based on one or more documents associated with the API.

Clause 4. The computing system of any one of clauses 2-3, wherein the operations further comprise extracting a parameter value from the natural language query input, wherein formulating the API query comprises mapping the parameter value to a target input value, wherein the mapping comprises: generating a vector representation of the parameter value; searching a value vector database containing vector representations of a plurality of input values, wherein the searching returns one or more candidate input values whose vector representations match the vector representation of parameter value; and prompting the generative AI model to select the target input value from the one or more candidate input values.

Clause 5. The computing system of clause 4, wherein the operations further comprise creating the value vector database, wherein creating the value vector database comprises: identifying the plurality of input values that can be provided as input for parameters of the plurality of APIs; embedding the plurality of input values into respective vector representations of the plurality of input values; and storing the vector representations of the plurality of input values into the value vector database.

Clause 6. The computing system of clause 5, wherein embedding an input value comprises generating a first vector representation of the input value based on a unique identifier of the input value and generating a second vector representation of the input value based on a text description of the input value.

Clause 7. The computing system of any one of clauses 4-6, wherein extracting the target entity and the parameter value comprises prompting the generative AI model with the natural language query input.

Clause 8. The computing system of any one of clauses 4-7, wherein formulating the API query comprises prompting the generative AI model to generate an API syntax based on the target API and the target input value.

Clause 9. The computing system of clause 8, wherein formulating the API query further comprises adding tenant configurations and authentication data to the API syntax.

Clause 10. The computing system of any one of clauses 1-9, wherein the operations further comprise: validating the API query prior to executing the API query; and formatting the query output, wherein the formatting comprises prompting the generative AI model.

Clause 11. A computer-implemented method comprising: receiving a natural language query input from a user interface; extracting a target entity from the natural language query input; identifying a target application programming interface (API) corresponding to the target entity; formulating an API query using the target API; and executing the API query to generate a query output on the user interface, wherein identifying the target API comprises: generating a vector representation of the target entity; searching an entity vector database containing vector representations of a plurality of APIs, wherein the searching returns one or more candidate APIs whose vector representations match the vector representation of the target entity; and prompting a generative artificial intelligence (AI) model to select the target API from the one or more candidate APIs.

Clause 12. The computer-implemented method of clause 11, further comprising creating the entity vector database, wherein creating the entity vector database comprises: extracting metadata from the plurality of APIs; generating an API graph based on the metadata extracted from the plurality of APIs, wherein the API graph defines a plurality of entities representing the plurality of APIs and associations between the plurality of entities; embedding the plurality of entities into respective vector representations of the plurality of APIs; and storing the vector representations of the plurality of APIs in the entity vector database.

Clause 13. The computer-implemented method of clause 12, wherein embedding an entity representing an API comprises generating a first vector representation of the API based on metadata of the API and generating a second vector representation of the API based on one or more documents associated with the API.

Clause 14. The computer-implemented method of clause 13, further comprising extracting a parameter value from the natural language query input, wherein formulating the API query comprises mapping the parameter value to a target input value, wherein the mapping comprises: generating a vector representation of the parameter value; searching a value vector database containing vector representations of a plurality of input values, wherein the searching returns one or more candidate input values whose vector representations match the vector representation of parameter value; and prompting the generative AI model to select the target input value from the one or more candidate input values.

Clause 15. The computer-implemented method of clause 14, further comprising creating the value vector database, wherein creating the value vector database comprises: identifying the plurality of input values that can be provided as input for parameters of the plurality of APIs; embedding the plurality of input values into respective vector representations of the plurality of input values; and storing the vector representations of the plurality of input values into the value vector database.

Clause 16. The computer-implemented method of clause 15, wherein embedding an input value comprises generating a first vector representation of the input value based on a unique identifier of the input value and generating a second vector representation of the input value based on a text description of the input value.

Clause 17. The computer-implemented method of any one of clauses 14-16, wherein extracting the target entity and the parameter value comprises prompting the generative AI model with the natural language query input.

Clause 18. The computer-implemented method of any one of clauses 14-17, wherein formulating the API query comprises prompting the generative AI model to generate an API syntax based on the target API and the target input value.

Clause 19. The computer-implemented method of any one of clauses 11-18, further comprising formatting the query output, wherein the formatting comprises prompting the generative AI model to transform the query output from a JSON format to a table format.

Clause 20. One or more non-transitory computer-readable media having encoded thereon computer-executable instructions causing one or more processors to perform a method, the method comprising: receiving a natural language query input from a user interface; extracting a target entity from the natural language query input; identifying a target application programming interface (API) corresponding to the target entity; formulating an API query using the target API; and executing the API query to generate a query output on the user interface, wherein identifying the target API comprises: generating a vector representation of the target entity; searching an entity vector database containing vector representations of a plurality of APIs, wherein the searching returns one or more candidate APIs whose vector representations match the vector representation of the target entity; and prompting a generative artificial intelligence (AI) model to select the target API from the one or more candidate APIs.

Example Alternatives

It should be noted that the technologies descried herein that leverage API metadata for intelligent user query answering are merely exemplary, and alternative approaches can be taken. For example, one alternative could be using UI metadata, which can be mapped to natural language input from the user. Automation tools like Selenium could be used to automate the navigation process to a given page and UI element. A hybrid approach of using both APIs and UI could also be considered, where the source of information can be determined optimally considering several factors. For instance, while retrieving answers via UI could be performance intensive, APIs could be the default choice for answering queries. If the user is already on the same UI page which has the context to the user's query, it might be useful to answer the question directly via the UI element on the page. For navigation related queries or rendering complex user interfaces like graphs, pie charts, etc., within the chat interface, intelligent UI based navigation or direct rendering of the UI element within the chat interface could be used.

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
memory;
one or more hardware processors coupled to the memory; and
one or more computer readable storage media storing instructions that, when loaded into the memory, cause the one or more hardware processors to perform operations comprising:
receiving a natural language query input from a user interface;
extracting a target entity from the natural language query input;
identifying a target application programming interface (API) corresponding to the target entity;
formulating an API query using the target API; and
executing the API query to generate a query output on the user interface,
wherein identifying the target API comprises:
generating a vector representation of the target entity;
searching an entity vector database containing vector representations of a plurality of APIs, wherein the searching returns one or more candidate APIs whose vector representations match the vector representation of the target entity, wherein the vector representations of the plurality of APIs correspond to a plurality of entities representing the plurality of APIs in an API graph that defines associations between the plurality of entities; and
prompting a generative artificial intelligence (AI) model to select the target API from the one or more candidate APIs.

2. The computing system of claim 1, wherein the operations further comprise creating the entity vector database, wherein creating the entity vector database comprises:
extracting metadata from the plurality of APIs;
generating the API graph based on the metadata extracted from the plurality of APIs;
embedding the plurality of entities into respective vector representations of the plurality of APIs; and
storing the vector representations of the plurality of APIs in the entity vector database.

3. The computing system of claim 2, wherein embedding an entity representing an API comprises generating a first vector representation of the API based on metadata of the API and generating a second vector representation of the API based on one or more documents associated with the API.

4. The computing system of claim 2, wherein the operations further comprise extracting a parameter value from the natural language query input, wherein formulating the API query comprises mapping the parameter value to a target input value, wherein the mapping comprises:
generating a vector representation of the parameter value;
searching a value vector database containing vector representations of a plurality of input values, wherein the searching returns one or more candidate input values whose vector representations match the vector representation of the parameter value; and
prompting the generative AI model to select the target input value from the one or more candidate input values.

5. The computing system of claim 4, wherein the operations further comprise creating the value vector database, wherein creating the value vector database comprises:
identifying the plurality of input values that can be provided as input for parameters of the plurality of APIs;
embedding the plurality of input values into respective vector representations of the plurality of input values; and
storing the vector representations of the plurality of input values into the value vector database.

6. The computing system of claim 5, wherein embedding an input value comprises generating a first vector representation of the input value based on a unique identifier of the input value and generating a second vector representation of the input value based on a text description of the input value.

7. The computing system of claim 4, wherein extracting the target entity and the parameter value comprises prompting the generative AI model with the natural language query input.

8. The computing system of claim 4, wherein formulating the API query comprises prompting the generative AI model to generate an API syntax based on the target API and the target input value.

9. The computing system of claim 8, wherein formulating the API query further comprises adding tenant configurations and authentication data to the API syntax.

10. The computing system of claim 1, wherein the operations further comprise:
validating the API query prior to executing the API query; and
formatting the query output, wherein the formatting comprises prompting the generative AI model.

11. A computer-implemented method comprising:
receiving a natural language query input from a user interface;
extracting a target entity from the natural language query input;
identifying a target application programming interface (API) corresponding to the target entity;
formulating an API query using the target API; and
executing the API query to generate a query output on the user interface,
wherein identifying the target API comprises:
generating a vector representation of the target entity;
searching an entity vector database containing vector representations of a plurality of APIs, wherein the searching returns one or more candidate APIs whose vector representations match the vector representation of the target entity, wherein the vector representations of the plurality of APIs correspond to a plurality of entities representing the plurality of APIs in an API graph that defines associations between the plurality of entities; and prompting a generative artificial intelligence (AI) model to select the target API from the one or more candidate APIs.

12. The computer-implemented method of claim 11, further comprising creating the entity vector database, wherein creating the entity vector database comprises:

extracting metadata from the plurality of APIs;

generating the API graph based on the metadata extracted from the plurality of APIs;

embedding the plurality of entities into respective vector representations of the plurality of APIs; and storing the vector representations of the plurality of APIs in the entity vector database.

13. The computer-implemented method of claim 12, wherein embedding an entity representing an API comprises generating a first vector representation of the API based on metadata of the API and generating a second vector representation of the API based on one or more documents associated with the API.

14. The computer-implemented method of claim 13, further comprising extracting a parameter value from the natural language query input, wherein formulating the API query comprises mapping the parameter value to a target input value, wherein the mapping comprises:

generating a vector representation of the parameter value;

searching a value vector database containing vector representations of a plurality of input values, wherein the searching returns one or more candidate input values whose vector representations match the vector representation of the parameter value; and prompting the generative AI model to select the target input value from the one or more candidate input values.

15. The computer-implemented method of claim 14, further comprising creating the value vector database, wherein creating the value vector database comprises:

identifying the plurality of input values that can be provided as input for parameters of the plurality of APIs;

embedding the plurality of input values into respective vector representations of the plurality of input values; and storing the vector representations of the plurality of input values into the value vector database.

16. The computer-implemented method of claim 15, wherein embedding an input value comprises generating a first vector representation of the input value based on a unique identifier of the input value and generating a second vector representation of the input value based on a text description of the input value.

17. The computer-implemented method of claim 14, wherein extracting the target entity and the parameter value comprises prompting the generative AI model with the natural language query input.

18. The computer-implemented method of claim 14, wherein formulating the API query comprises prompting the generative AI model to generate an API syntax based on the target API and the target input value.

19. The computer-implemented method of claim 11, further comprising formatting the query output, wherein the formatting comprises prompting the generative AI model to transform the query output from a JSON format to a table format.

20. One or more non-transitory computer-readable media having encoded thereon computer-executable instructions causing one or more processors to perform a method, the method comprising:

receiving a natural language query input from a user interface;

extracting a target entity from the natural language query input;

identifying a target application programming interface (API) corresponding to the target entity;

formulating an API query using the target API; and executing the API query to generate a query output on the user interface, wherein identifying the target API comprises:

generating a vector representation of the target entity;

searching an entity vector database containing vector representations of a plurality of APIs, wherein the searching returns one or more candidate APIs whose vector representations match the vector representation of the target entity, wherein the vector representations of the plurality of APIs correspond to a plurality of entities representing the plurality of APIs in an API graph that defines associations between the plurality of entities; and prompting a generative artificial intelligence (AI) model to select the target API from the one or more candidate APIs.

* * * * *